United States Patent
Kohnen

(10) Patent No.: US 11,877,901 B2
(45) Date of Patent: Jan. 23, 2024

(54) CASTING MATRIX FOR CASTING AN ARTIFICIAL GINGIVA PART

(71) Applicant: EXOCAD GMBH, Darmstadt (DE)

(72) Inventor: Michael Kohnen, Darmstadt (DE)

(73) Assignee: EXOCAD GMBH, Darmstadt (DE)

( * ) Notice: Subject to any disclaimer, the term of this patent is extended or adjusted under 35 U.S.C. 154(b) by 23 days.

(21) Appl. No.: 17/531,153

(22) Filed: Nov. 19, 2021

(65) Prior Publication Data
US 2023/0157796 A1    May 25, 2023

(51) Int. Cl.
| A61C 13/00 | (2006.01) |
| A61C 13/08 | (2006.01) |
| B33Y 80/00 | (2015.01) |
| A61C 13/01 | (2006.01) |
| A61C 13/20 | (2006.01) |

(52) U.S. Cl.
CPC ........ *A61C 13/081* (2013.01); *A61C 13/0004* (2013.01); *A61C 13/0019* (2013.01); *A61C 13/04* (2013.01); *A61C 13/20* (2013.01); *B33Y 80/00* (2014.12)

(58) Field of Classification Search
CPC ............ A61C 13/0004; A61C 13/0019; A61C 13/081
See application file for complete search history.

(56) References Cited

U.S. PATENT DOCUMENTS

| 2019/0247167 A1 | 8/2019 | Forest |
| 2020/0107916 A1 | 4/2020 | Senn et al. |

FOREIGN PATENT DOCUMENTS

| CA | 3028891 A1 * | 1/2018 | ......... A61C 13/0004 |
| DE | 102016105628 A1 | 9/2017 | |
| EP | 2915503 A1 | 9/2015 | |
| WO | WO-2012041329 A1 * | 4/2012 | ......... A61C 13/0004 |
| WO | WO-2013120955 A1 * | 8/2013 | ......... A61C 13/0004 |

OTHER PUBLICATIONS

Fouquet, Michele, International Search Report, dated Feb. 15, 2023, issued in corresponding PCT Application No. PCT/EP2022/081748, filed Nov. 14, 2022.

* cited by examiner

*Primary Examiner* — James Sanders
(74) *Attorney, Agent, or Firm* — PERRY + CURRIER INC.

(57) ABSTRACT

The invention relates to a computer-implemented method for providing a template for a casting matrix configured for casting one or more artificial gingiva parts of a removable denture. The casting matrix comprises one or more recesses. Each of the recesses has a 3D geometric form, which is a negative of a 3D geometric form of a section of the removable denture with one of the artificial gingiva parts to be casted.

44 Claims, 18 Drawing Sheets

CASTING MATRIX FOR CASTING AN ARTIFICIAL GINGIVA PART

The invention relates to the field of dental technology. More particularly, the invention relates to a computer-implemented method for providing a template for a casting matrix configured for casting one or more artificial gingiva parts of a removable denture. The invention furthermore relates to a computer device and a computer program product for providing a template for a casting matrix configured for casting one or more artificial gingiva parts of a removable denture as well as to a manufacturing system comprising the computer device. Furthermore, the invention relates to a machined or 3D printed casting matrix configured for casting one or more artificial gingiva parts of a removable denture.

Removable dentures are prosthetic devices constructed to replace missing teeth of a patient, e.g., for functional and/or aesthetic reasons. They are configured to be arranged on tissues of an oral cavity of the patient and may be removed from as well as reinserted into the oral cavity by the patient on his own as desired. Such removable dentures may comprise one or more replacement teeth attached to a base providing an artificial gingiva for the replacement teeth. The base with the artificial gingiva is required to provide sufficient stability to ensure a structural integrity of the removable denture, when being used, e.g., for chewing. The artificial gingiva may be shaped and colored to mimic the patient's natural gingiva. Furthermore, the artificial gingiva is required to fit the natural geometry of the in the patient's tissues on which the removable is arranged within the oral cavity.

It is an objective to provide for a computer-implemented method, a computer device and computer program product for providing a template for a casting matrix configured for casting one or more artificial gingiva parts of a removable denture. Furthermore, it is an objective to provide for a manufacturing system for manufacturing a casting matrix configured for casting one or more artificial gingiva parts of a removable denture It is a further objective to provide for a machined or 3D printed casting matrix configured for casting one or more artificial gingiva parts of a removable denture.

In one aspect, the invention relates to a computer-implemented method for providing a template for a casting matrix configured for casting one or more artificial gingiva parts of a removable denture. The casting matrix comprises one or more recesses. Each of the recesses has a 3D geometric form, which is a negative of a 3D geometric form of a section of the removable denture with one of the artificial gingiva parts to be casted.

The method comprises providing a 3D digital tissue model of tissue of an oral cavity of a patient on which the removable denture is to be arranged. A 3D digital denture model of the removable denture is provided using the 3D digital tissue model. The removable denture comprises one or more artificial teeth arranged within the one or more artificial gingiva parts arranged on the 3D digital tissue model. The 3D digital tissue model and the 3D digital denture model are used for generating a 3D digital matrix model of the casting matrix. The 3D digital matrix model envelops the one or more sections of the 3D digital denture model with the one or more artificial gingiva parts arranged on the 3D digital tissue model. The 3D digital matrix model is provided as template for manufacturing the casting matrix.

Examples may have the beneficial effect of providing a digital template for manufacturing a casting matrix configured for casting one or more artificial gingiva parts of a removable denture as defined by a 3D digital denture model. The 3D digital denture model may be generated using a 3D digital tissue model. The 3D digital tissue model may be generated using scan data of the patient's oral cavity. For example, the patient's tissue in the oral cavity may be scan using a scanner, e.g., an optical scanner. The achieved scan data may be used to provide the 3D digital tissue model of the scanned tissue of the oral cavity. Alternatively, an impression of the patient's tissue in the oral cavity, i.e., a negative imprint of hard and soft tissue may be taken. Either this impression may be scanned, e.g., using an optical scanner or the negative imprint provided by the impression may be used to generate a positive reproduction of the patient's tissue, i.e., a 3D physical tissue model or cast, which is scanned, e.g., by the optical scanner to provide the scan data used to generate the 3D digital tissue model.

The 3D digital tissue model may be used as a base on which the 3D digital denture model is generated. The 3D digital denture model may define a removable partial denture designed for completing the patient's denture as defined by the 3D digital tissue model, which is missing one or more teeth. The 3D digital denture model may be configured to replace one or more missing teeth on the mandibular arch or on the maxillary arch of the patient. The 3D digital denture model may define a removable complete denture used to replace a missing dental arch on the patient's remaining edentulous tissue defined by the 3D digital tissue model. The edentulous tissue may, e.g., an edentulous mandibular arch or an edentulous maxillary arch of the patient.

For example, the 3D digital tissue model may resemble 1:1 the patient's natural tissue. For example, the 3D digital tissue model may be modified relative to the patient's natural tissue by adding non-anatomical elements in order to implement features configured to facilitate the usage of the casting matrix. The modified 3D digital tissue model may be used as a template to manufacture a physical tissue model used in combination with the casting matrix to generate the removable denture. The physical tissue model may comprise the non-anatomical elements. For example, the non-anatomical elements may be used to implement feature to which the 3D digital matrix model is not adjusted, but which may still facilitate the usage of the casting matrix in combination with the physical tissue model. For example, the non-anatomical elements may be used to implement feature to which the 3D digital matrix model is adjusted. For example, the non-anatomical elements facilitate connecting the casting matrix to the physical tissue model. For example, the non-anatomical elements comprise connecting elements. For example, the non-anatomical elements comprise lateral protrusions configured to bridge undercuts of the artificial gingiva parts of the 3D digital denture model. With the undercuts bridged, the casting matrix may be designed using a simpler geometry without having to take the undercuts into consideration. With the undercuts bridged, the casting matrix may, e.g., have straight wall sections facilitating removing the casting matrix from the removable denture after the casting material is cured.

The 3D digital denture model, and in particular the one or more artificial gingiva parts comprised by the 3D digital denture model, may be adjusted to fit precisely on the 3D digital tissue model. A casting matrix manufactured using the 3D digital matrix model may be used to manufacture a removable denture resembling the 3D digital denture model.

The casting matrix as defined by the 3D digital matrix model may be configured for casting one or more artificial gingiva parts of the removable denture. The casting matrix may be configured for receiving one or more elements of the removable denture to be integrated and/or connected to the artificial gingiva parts to be casted, like one or more artificial teeth and/or a supporting framework. The casting matrix comprises recesses defining negatives of sections of the removable denture with the artificial gingiva parts to be casted. The recesses may each comprise one or more receptions for receiving the one or more artificial teeth of the removable denture. These artificial teeth may to be connected to the artificial gingiva parts to be casted. By inserting casting material into casting matrix, the casting material may fill up the remaining space within the recesses and be distributed around the elements of the removable denture arranged within the recesses. For example, liquid plastic may be used as casting material. After the inserted casting material is cured, the elements of the removable denture are connected to the casting material and/or enveloped by the casting material. Thus, a removable denture with artificial teeth and an artificial gingiva may be manufactured using the casting matrix. The casting matrix defines the shaped, i.e., the 3D geometrical form, of the artificial gingiva parts. In addition, the color of the casting material may be chosen such that it resembles the color of the natural gingiva of the patient. The resulting artificial gingiva parts may be shaped and colored to mimic the patient's natural gingiva.

The removable denture may comprise multiple elements made from different materials. Besides artificial teeth, a removable denture may, e.g., comprise a supporting framework. The supporting framework may be configured for supporting the one or more teeth of the removable denture and/or for stabilizing the removable denture. In addition, the supporting framework may be configured for mounting the removable denture one or more dental elements, like teeth, comprised by the tissue of the oral cavity.

In order to be able to mimic the patient's natural gingiva in shape as well as in color and at the same time to provide a comfortable and stable fitting on the patient's natural gingiva, the artificial gingiva may have to, at least partially, enclose the supporting framework. An upper section of the artificial gingiva may extend over the supporting framework mimicking the patient's natural gingiva, while a lower section may extend underneath the framework and provide a supporting surface shaped to fit onto the tissue of the oral cavity. Using CAD/CAM manufacturing methods like 3D printing or machining, may exclude manufacturing the artificial gingiva part enclosing a part of the supporting framework as one piece, wherein the upper section of the artificial gingiva is formed integrally with the lower upper section of the artificial gingiva. Using a casting matrix for an artificial gingiva part of a removable denture may allow for casting the respective artificial gingiva part as one piece, wherein the upper section of the artificial gingiva is formed integrally with the lower upper section of the artificial gingiva.

The tissue in the oral cavity resembled by the 3D digital tissue model may comprise soft tissue, like the gingiva comprising mucosal tissue lying over the mandible and maxilla inside the oral cavity. The tissue in the oral cavity may comprise hard tissue, e.g., mineralized tissue like teeth or more precisely tooth enamel.

For example, the casting matrix is configured for being arranged on at least one of the following: tissue of the oral cavity of the patient on which the removable denture is to be arranged, on a physical tissue model of the tissue of the oral cavity of the patient on which the removable denture is to be arranged.

For example, the casting matrix may be configured for being arranged on at least one of the following: tissue of the oral cavity of the patient on which the removable denture is to be arranged, on a physical tissue model of the tissue of the oral cavity of the patient on which the removable denture is to be arranged.

For example, the casting matrix may be configured for being arranged on tissue of the oral cavity of the patient on which the removable denture is to be arranged. Examples may have the beneficial effect of providing a 3D digital matrix model as the template for manufacturing the casting matrix, which enables a casting of the artificial gingiva parts of the removable denture in the oral cavity of the patient. The 3D digital tissue model used to generate the 3D digital matrix model may resemble, e.g., 1:1, the respective tissue of the oral cavity of the patient on which the removable denture is to be arranged.

For example, the casting matrix may be configured for being arranged on a physical tissue model of the tissue of the oral cavity of the patient on which the removable denture is to be arranged. Examples may have the beneficial effect of providing a 3D digital matrix model as the template for manufacturing the casting matrix, which enables a casting of the artificial gingiva parts of a physical tissue model, Such a physical tissue model may be easy to handle, thereby facilitating the casting of the artificial gingiva parts. Furthermore, physical tissue model may comprise non-anatomical elements configured to facilitate the usage of the casting matrix provided using the 3D digital matrix model. For example, the 3D digital matrix model and thus the casting matrix may be adjusted to one or more of the non-anatomical elements of the physical tissue model. Thus, the physical tissue model may be optimized for being used in combination with the casting matrix to cast the artificial gingiva parts of a physical tissue model.

For example, the method further comprises manufacturing the casting matrix using the 3D digital matrix model as the template. The manufactured casting matrix is a physical copy of the respective template. Examples may have the beneficial effect that the casting matrix may be provided for casting the one or more artificial gingiva parts of the removable denture as defined by the 3D digital denture model.

For example, the casting matrix is manufactured using one of the following: machining, 3D printing, casting. For example, the casting matrix may be manufactured using a machining device configured to manufacture the casting matrix by processing a blank to provide a casting model with a 3D geometry defined by the 3D digital matrix model. For example, the casting matrix may be manufactured using a 3D printing device, i.e., printer, configured to print the casting matrix with a 3D geometry defined by the 3D digital matrix model. For example, the 3D digital matrix model may be used as a positive to define a negative of the casting matrix in form of a negative 3D digital matrix model. The negative 3D digital matrix model may, e.g., be used to manufacture, e.g., using machining or 3D printing, a matrix for casting the casting matrix, which may then be used to cast the one or more artificial gingiva parts of the removable denture defined by the 3D digital denture model.

The casting matrix may, e.g., be made from silicone or plastic.

For example, the method further comprises providing the 3D digital tissue model as template for manufacturing a physical tissue model of the tissue of the oral cavity of the patient on which the removable denture is to be arranged. The casting matrix is configured for being arranged on the tissue model. The tissue model is manufactured using the 3D digital tissue model as template. The manufactured tissue model is a physical copy of the respective template.

Examples may have the beneficial effect of providing a physical tissue model, which may be used in combination with the physical casting matrix for casting the one or more artificial gingiva parts of the removable denture as defined by the 3D digital denture model. The manufactured tissue model may resemble, e.g., 1:1, the tissue of the oral cavity of the patient on which the removable denture is to be arranged. For example, the physical tissue model may in addition comprise non-anatomical elements configured to facilitate the usage of the casting matrix provided using the 3D digital matrix model. For example, the casting matrix may be adjusted to one or more of the non-anatomical elements of the physical tissue model. Thus, the physical tissue model may be optimized for being used in combination with the casting matrix to cast the artificial gingiva parts of a physical tissue model.

For example, the tissue model is manufactured using one of the following: machining, 3D printing, casting. For example, the tissue model may be manufactured using a machining device configured to manufacture the tissue model by processing a blank to provide a casting model with a 3D geometry defined by the 3D digital tissue model. For example, the tissue model may be manufactured using a 3D printing device, i.e., printer, configured to print the tissue model with a 3D geometry defined by the 3D digital tissue model. For example, the 3D digital tissue model may be used as a positive to define a negative of the tissue model in form of a negative 3D digital tissue model. The negative 3D digital tissue model may, e.g., be used to manufacture, e.g., using machining or 3D printing, a matrix for casting the tissue model, which may then be used in combination with the casting matrix defined by the 3D digital matrix model to cast the one or more artificial gingiva parts of the removable denture defined by the 3D digital denture model.

For example, the method further comprises providing one or more 3D digital tooth models of one or more teeth comprised by the 3D digital denture model as templates for manufacturing the one or more teeth of the removable denture. The one or more teeth of the removable denture are manufactured using the 3D digital tooth models as templates.

The manufactured teeth are physical copies of the respective templates.

Examples may have the beneficial effect of providing the physical artificial teeth to be inserted into and connected to the removable denture. The artificial teeth may be arranged in the receptions of the recesses of the casting matrix and anchored within the casted artificial gingiva parts, when the casting material inserted into the casting matrix is cured.

The 3D digital tooth models may, e.g., be provided by applying a segmentation to the 3D digital denture model.

For example, the 3D digital tooth models are added to the 3D digital denture model such that they can in addition be used as templates for manufacturing one or more teeth. For example, the 3D digital tooth models are 3D digital models of library teeth from a tooth library. For example, the 3D digital tooth models, i.e., the artificial teeth to be added to the removable denture, may be selected from a tooth library providing a plurality of sets of artificial teeth. For example, the 3D digital tooth models may be added to the 3D digital denture model as well as adjusted to the 3D digital tissue model and/or to each other.

For example, the one or more teeth are manufactured using one of the following: machining, 3D printing, casting. For example, the one or more teeth may be manufactured using a machining device configured to manufacture the one or more teeth by processing one or more blanks to provide one or more artificial teeth with 3D geometries defined by the one or more 3D digital tooth models of the 3D digital denture model. For example, the one or more teeth may be manufactured using a 3D printing device, i.e., printer, configured to print the teeth with 3D geometries defined by the one or more 3D digital tooth models of the 3D digital denture model. For example, the 3D digital tooth models may be used as positives to define one or more negatives of the one or more teeth in form of one or more negative 3D digital teeth models. The one or more negative 3D digital tooth models may, e.g., be used to manufacture, e.g., using machining or 3D printing, one or more matrices for casting the one or more artificial teeth, which may then be inserted into the casting matrix defined by the 3D digital matrix model to manufacture the removable denture by casting the one or more artificial gingiva parts of the removable denture defined by the 3D digital denture model.

For example, the 3D digital denture model further comprises a 3D digital framework model of a supporting framework of the removable denture. The supporting framework is configured for supporting the one or more teeth of the removable denture and stabilizing the removable denture.

Examples may have the beneficial effect that a supporting framework may be designed in order to support the one or more teeth of the removable denture as well as to stabilize the removable denture. The 3D digital framework model may, e.g., be provided by scanning a supporting framework manufactured for the removable denture. The 3D digital framework model may, e.g., be generated from scratch or the 3D digital framework model may be generated by adjusting a 3D digital model of a generic supporting framework to the 3D digital tissue model and/or the 3D digital denture model, to which the 3D digital model of a generic supporting framework is added. For example, a set of 3D digital models of elements of generic supporting frameworks, i.e., generic supporting elements, may be provided. From this set of 3D digital models of elements of generic supporting frameworks one or more 3D digital models may, e.g., be selected, combined and adjusted to the 3D digital tissue model in order to provide the 3D digital framework model.

The 3D digital framework model may, e.g., be a 3D digital model of a supporting framework to be provided in form of a metal framework.

The supporting framework may, e.g., comprise one or more direct retainers for connecting the removable denture to the patient's remaining dentition, e.g., one or more remaining teeth or tooth stumps, or an artificial abutment, e.g., an abutment attached to an implant. The direct retainers may for example comprise rests, clasps or telescopes. A telescopic fitting may, e.g., be configured to fit over an abutment attached to an implant. The supporting framework may be configured to fit over a dental bar for support. The supporting framework may further comprise one or more major connectors and/or one or more minor connectors. The supporting framework may further comprise offsets, e.g., risers and reliefs.

A major connector is an element of a removable partial denture providing a link between elements of the removable partial denture arranged on different sides of a patient's dental arch. Such a major connector may for example be provided in form of a lingual bar, a sublingual bar, a prelingual bar, a lingual plate, a buccal bar, a continuous clasp, a palatal plate, a palatal spoon plate, a palatal bar, or a u-shaped palatal bar. A minor connector is an element of a removable partial denture providing a link between the major connector and other elements of the removable partial denture. A direct retainer or stabilizer is an element of the removable partial denture connecting the removable partial denture to an abutment tooth or other kind of abutment. It may retain and stabilize the removable partial denture in the oral cavity. A direct retainer or stabilizer may partially encompass or contact the abutment.

For example, the supporting framework is at least partially comprised by the one or more artificial gingiva parts of the removable denture. Thus, the supporting framework may be able to support the one or more artificial gingiva parts and provide stability to the removable denture. However, problems may arise, when printing trying to print the one or more artificial gingiva parts as a whole and at the same time to arrange e the supporting framework within the one or more artificial gingiva parts. For example, sections of the one or more artificial gingiva parts extending over and/or laterally along the supporting framework may be printed. However, this may result in one or more hollow sections below the supporting framework.

Using a casting matrix for casting artificial gingiva parts of the removable denture may prevent such hollow sections below the supporting framework. Casting material inserted into the casting matrix may spread below the supporting framework due to its fluidity. The casting material may, e.g., spread around at least a part of the supporting framework, enveloping the respective section. Fluidity refers to the reciprocal of viscosity. The viscosity of a fluid is a measure of its resistance to deformation at a given rate.

The one or more gingiva parts being casted may, e.g., each envelope at least a part of the supporting framework. For example, the supporting framework is arranged within the casting matrix together with the one or more artificial teeth before the casting material is inserted into the casting matrix.

The one or more gingiva parts being casted may, e.g., be lower gingiva parts extending underneath the supporting framework. For example, the one or more pre-manufactured additional gingiva parts may be upper gingiva parts extending over the supporting framework of the removable denture. This additional gingiva parts may be manufactured before casting the other gingiva parts. For example, the additional gingiva parts are manufactured using machining or 3D printing with the 3D digital denture model providing a template for the additional gingiva parts.

For example, the supporting framework is arranged within the casting matrix together with the one or more artificial teeth and the pre-manufactured additional gingiva parts before the casting material is inserted into the casting matrix. For example, the pre-manufactured additional gingiva parts each comprises one or more receptions for receiving one or more of the artificial teeth. For example, the receptions for receiving the artificial teeth are provided in form of blind holes or through-holes, in which the artificial teeth are inserted. The casted gingiva parts may complete the additional gingiva parts by extending below the supporting framework such that the resulting artificial gingiva envelopes at least a part of the supporting framework without any hollow sections below the supporting framework. The casted gingiva parts may each comprise a supporting surface configured to support the casted gingiva parts and thus the removable denture on natural tissue within the patient's oral cavity. The supporting surface may have a 3D geometry resembling a negative of the geometry of the natural tissue of the patient, on which the respective casted gingiva part is to be arranged.

For example, the supporting framework is further configured to fix the removable denture to one or more teeth of the tissue model. For example, the supporting framework may comprise one or more retaining elements, like clasps, configured for retaining the removable denture at its predefined place at the one or more teeth of the tissue model.

For example, the method further comprises providing the 3D digital framework model as template for manufacturing the supporting framework. The supporting framework is manufactured using the 3D digital framework model as template. The manufactured supporting framework is a physical copy of the respective template.

Examples may have the beneficial effect of providing a physical supporting framework, which may be used to manufacture the removable denture. The physical supporting framework may be arranged within the physical casting matrix and the one or more artificial teeth before the casting matrix is arranged on the patient's natural tissue or a tissue model of the patient's natural tissue.

For example, the supporting framework is manufactured using one of the following: machining, 3D printing, casting. For example, the supporting framework may be manufactured using a machining device configured to manufacture the supporting framework by processing a blank to provide a supporting framework with a 3D geometry defined by the 3D digital framework model. For example, the supporting framework may be manufactured using a 3D printing device, i.e., printer, configured to print the supporting framework with a 3D geometry defined by the 3D digital framework model. For example, the 3D digital tissue model may be used as a positive to define a negative of the supporting framework in form of a negative 3D digital framework model. The negative 3D digital framework model may, e.g., be used to manufacture, e.g., using machining or 3D printing, a matrix for casting the supporting framework, which may then be inserted into the casting matrix defined by the 3D digital matrix model and used manufacture the denture model by casting artificial gingiva parts of the removable denture defined by the 3D digital denture model.

The supporting framework may be a metal framework. Such a metal framework may, e.g., be 3D printed using a selective laser sintering or melting method, Selective laser sintering uses a laser for sintering a powdered material, aiming the laser automatically at points in space defined by a 3D digital model of the element to be printed. The laser energy may result in a local sintering or melting of the powdered material, binding the material together to create a solid structure.

For example, the method further comprises manufacturing the removable denture. The manufacturing of the removable denture comprises arranging one or more artificial teeth of the removable denture in the one or more receptions of the one or more recesses of the manufactured casting matrix. The manufactured casting matrix with the one or more artificial teeth of the removable denture is arranged on the physical tissue model. Casting material for casting the one or more artificial gingiva parts of the removable denture is inserted into the remaining free space of the one or more recesses of the manufactured casting matrix arranged on the physical tissue model. The manufactured casting matrix is removed from the physical tissue model, after the inserted casting material is cured. The removable denture is provided comprising the one or more artificial gingiva parts casted using the casting material.

Examples may have the beneficial effect of providing a removable denture defined by the 3D digital denture model using the manufactured casting matrix defined by the 3D digital matrix model. The removable denture may comprise one or more artificial gingiva parts casted using the casting matrix as well as one or more artificial teeth. For manufacturing the removable denture, a tissue model may be used. Using a tissue model may have the beneficial effect that the tissue model may not only resemble the natural tissue in the patient's oral cavity, but in addition may also be provided with additional non-anatomical elements in order to facilitate the casting. For example, the tissue model may comprise connection sections for connecting the casting matrix and/or lateral protrusions for bridging undercuts of the natural tissue.

For example, the manufacturing of the removable denture further comprises arranging the supporting framework on the physical tissue model, such that at least one or more sections of the supporting framework are arranged within the one or more recesses of the casting matrix arranged on the physical tissue model. Examples may have the beneficial effect providing a removable denture comprising a supporting framework. The supporting framework may support the one or more artificial teeth of the removable denture as well as stabilize the removable denture, in particular the one or more artificial gingiva parts casted using the casting matrix.

For example, the method further comprises manufacturing the removable denture. The manufacturing of the removable denture comprises arranging one or more artificial teeth of the removable denture in the one or more receptions of the one or more recesses of the manufactured casting matrix. The manufactured casting matrix with the one or more artificial teeth of the removable denture is arranged on the tissue in the oral cavity of the patient. Casting material for casting the one or more artificial gingiva parts of the removable denture is inserted into the remaining free space of the one or more recesses of the manufactured casting matrix arranged on the tissue. The manufactured casting matrix is removed from the tissue, after the inserted casting material is cured. The removable denture is comprising with the one or more artificial gingiva parts casted using the casting material.

Examples may have the beneficial effect of providing a removable denture defined by the 3D digital denture model using the manufactured casting matrix defined by the 3D digital matrix model. The removable denture may comprise one or more artificial gingiva parts casted using the casting matrix as well as one or more artificial teeth. The one or more artificial gingiva parts casted may be casted within the patient's oral cavity. Thus, the natural tissue may be used to ensure a precise anatomical fit of the gingiva parts casted within the oral cavity.

The method may further comprise arranging a protective film layer, e.g., a plastic sheet, on the tissue in the oral cavity of the patient. For example, the protective film layer may be arranged on the tissue before arranging the manufactured casting matrix with the one or more artificial teeth of the removable denture thereon. The protective film layer may protect the tissue from direct contact with the casting material.

For example, the manufacturing of the removable denture further comprises arranging the supporting framework on the tissue in the oral cavity, such that at least one or more sections of the supporting framework are arranged within the one or more recesses of the casting matrix arranged on the tissue. Examples may have the beneficial effect providing a removable denture comprising a supporting framework. The supporting framework may support the one or more artificial teeth of the removable denture as well as stabilize the removable denture, in particular the one or more artificial gingiva parts casted using the casting matrix.

When arranging the supporting framework on the tissue in the oral cavity, the supporting framework may, e.g., be fixed to one or more natural teeth within the oral cavity of the patient. For example, the supporting framework may comprise one or more retaining elements, like clasps, configured for retaining the removable denture at its predefined place within the oral cavity.

For example, the method further comprises manufacturing one or more additional gingiva parts of the removable denture to be complemented by the one or more gingiva parts being casted. The one or more additional gingiva parts are arranged together with the artificial teeth in the one or more recesses of the manufactured casting matrix. Examples may have the beneficial effect that the one or more additional gingiva parts may be pre-manufactured gingiva parts. The 3D geometric form of the pre-manufactured gingiva parts may be defined by the 3D digital denture model. These pre-manufactured gingiva parts may be manufactured, e.g., using machining or 3D printing.

For example, the one or more additional gingiva parts are manufactured using one of the following: machining, 3D printing. For example, the additional gingiva parts may be manufactured using a machining device configured to manufacture the one or more additional gingiva parts by processing one or more blank to provide one or more additional gingiva parts with 3D geometries defined by the 3D digital denture model. For example, the additional gingiva parts may be manufactured using a 3D printing device, i.e., printer, configured to print the additional gingiva parts with 3D geometries defined by the 3D digital denture model.

For example, 3D digital models of the additional gingiva parts may be provided. These 3D digital models of the additional gingiva parts may, e.g., be used as templates for manufacturing the one or more additional gingiva parts. The 3D digital models of the additional gingiva parts may, e.g., be comprised by the 3D digital denture model. For example, the 3D digital models of the additional gingiva parts may be provided by applying a segmentation to the 3D digital denture model, more precisely to the artificial gingiva defined by the 3D digital denture model.

For example, the 3D digital models of the additional gingiva parts may be added to the 3D digital denture model such that they can in addition be used as templates for manufacturing one or more additional gingiva parts. For example, the 3D digital models of the additional gingiva parts are provided by a gingiva library providing 3D digital models of artificial gingivas. For example, the 3D digital gingiva models provided by the gingiva library may each be provided as a set of gingiva parts or each of the 3D digital gingiva models may comprise predefined splitting contours for splitting the respective 3D digital gingiva model in a plurality of gingiva parts. For example, the 3D digital models of the additional gingiva parts to be added to the removable denture, may be selected from a gingiva library providing a plurality of sets of gingiva parts. For example, the 3D digital models of the additional gingiva parts may be added to the 3D digital denture model as well as adjusted to the 3D digital tissue model and/or to each other.

For example, the one or more additional gingiva parts are upper gingiva parts extending over the supporting framework of the removable denture. The one or more gingiva parts being casted are lower gingiva parts extending underneath the supporting framework. Examples may have the beneficial effect that the casted lower gingiva parts may be used to complete the upper gingiva parts, i.e., the pre-manufactured additional gingiva parts. Thus, hollow sections below the supporting framework may be filled.

The upper side of the removable denture, at least partially provided by the upper gingiva parts, is the side of the removable denture on which the one or more artificial teeth are arranged, while the lower side is the side opposite to the upper side. The upper gingiva parts extending over the supporting framework of the removable denture may thus extend around the artificial teeth. The lower side of the removable denture is, at least partially, provided by the lower gingiva parts extending underneath the supporting framework and configured to be arranged on the tissue in the oral cavity of the patient.

For example, the 3D digital matrix model is configured to build a sealed contact between boundaries of the one or more recesses of the 3D digital matrix model arranged on the 3D digital tissue model and the 3D digital tissue model. The sealed contact prevents the casting material from escaping from the one or more recesses. Examples may have the beneficial effect that the casting material may be effectively prevented from escaping from the one or more recesses, when being inserted into the casting matrix arranged on the tissue model. For building the sealed contact a contour of the 3D digital matrix model may be a negative of a contour of a contact line or face of the 3D digital tissue model. Thus, a contour of the physical casting matrix may be a negative of a contour of a contact line or face of the tissue model, ensuring a tight fit of the casting matrix on the tissue model providing the sealed contact.

The resulting casting matrix may thus be configured to build a sealed contact between boundaries of the of the one or more recesses of the casting matrix arranged on the physical tissue model and the physical tissue model. The sealed contact prevents casting material from escaping from the one or more recesses.

The resulting casting matrix may thus be configured to build a sealed contact between boundaries of the of the one or more recesses of the casting matrix arranged on the tissue in the oral cavity and the tissue. The sealed contact prevents casting material from escaping from the one or more recesses. For building the sealed contact a contour of the 3D digital matrix model may be a negative of a contour of a contact line or face of the 3D digital tissue model resembling the natural tissue in the oral cavity of the patient. Thus, a contour of the physical casting matrix may be a negative of a contour of a contact line or face of the natural tissue in the oral cavity of the patient, ensuring a tight fit of the casting matrix on the natural tissue providing the sealed contact.

The resulting casting matrix may thus comprise one or more openings between boundaries of the one or more recesses of the casting matrix arranged on the physical tissue model and the physical tissue model. The openings are configured for inserting casting material into the one or more recesses.

For example, the 3D digital matrix model comprises one or more openings between boundaries of the one or more recesses of the 3D digital matrix model arranged on the 3D digital tissue model and the 3D digital tissue model. The openings are configured for inserting casting material into the one or more recesses. Examples may have the beneficial effect that the openings may facilitate inserting the casting material into the casting matrix. The casting material may, e.g., be poured into the casting matrix via the one or more openings.

For example, the one or more openings are arranged on at least one of the following sides of the one or more recesses: on an oral side, on a vestibular side.

The 3D digital matrix model comprises one or more injection channels configured for inserting the casting material by injecting the casting material into the one or more recesses of the 3D digital matrix model Examples may have the beneficial effect that the injection channels may facilitate injecting the casting material into the casting matrix. For injecting the casting material, an injection device may be used, e.g., a reciprocating pump, like a syringe. The injection channels may each, e.g., comprise a mouth. The mouths of the injection channels may, e.g., be arranged on an occlusal side of the casting matrix.

The resulting casting matrix, manufactured using the 3D digital matrix model as a template, may thus comprise one or more injection channels configured for inserting the casting material by injecting the casting material into the one or more recesses of the casting matrix.

For example, the 3D digital matrix model comprises one or more venting channels configured for letting out air form the one or more recesses, when the casting material is injected into the one or more recesses of the 3D digital matrix model. Examples may have the beneficial effect that the venting channels may ensure an effective venting of the casting matrix manufactured using the 3D digital matrix model as a template, when the casting material being injected into the casting matrix generates an overpressure within the casting matrix relative to the environment of the casting matrix.

The resulting casting matrix may thus comprise one or more venting channels configured for letting out air form the one or more recesses, when the casting material is inserted, e.g., injected, into the one or more recesses of the casting matrix.

For example, the 3D digital matrix model comprises one or more positioning elements for arranging and fixating the casting matrix at a predefined position on the 3D digital tissue model. Examples may have the beneficial effect that the positioning elements may facilitate a positioning and/or fixating of the casting material on the tissue model resembling the natural tissue of the patient or the natural tissue within the oral cavity of the patient.

The resulting casting matrix may thus comprise one or more positioning elements for arranging and fixating the casting matrix at a predefined position on the physical tissue model.

For example, the positioning elements comprise one or more tooth fixating elements for fixating the casting matrix at one or more teeth of the 3D digital tissue model. Examples may have the beneficial effect that the positioning elements may facilitate a positioning and/or fixating of the casting material using the natural teeth of the patient or teeth of the tissue model resembling natural teeth of the patient.

For example, the tooth fixating elements comprise one or more receptions for receiving one or more teeth of the 3D digital tissue model. The receptions may, e.g., be configured to receive natural teeth of the patient or teeth of the tissue model resembling natural teeth of the patient.

For example, the positioning elements comprise one or more claps configured to clip onto one or more natural teeth of the patient or teeth of the tissue model resembling natural teeth of the patient, in order to retain the casting matrix at a predefined position.

For example, the positioning elements comprise one or more first connection sections configured for establishing a non-destructive detachable connection with one or more second connection sections added to the 3D digital tissue model. Each of the first connection sections comprises one or more non-anatomical first connection elements. Each of the second connection sections comprises one or more non-anatomical second connection elements.

Examples may have the beneficial effect that by adding the non-anatomical connection elements, the 3D digital matrix model and the 3D digital tissue model may be effectively connectable in order to provide a stable non-destructive detachable connection between the both during the casting of the one or more artificial gingiva parts of the removal denture. Thus, the physical casting matrix manufactured using the 3D digital matrix model as a template as well as the physical tissue model manufactured using the 3D digital tissue model as a template may both comprise non-anatomical connection elements.

The one or more non-anatomical first connection elements may, e.g., comprise one or more protrusions configured to be received by one or more receptions provided by the one or more non-anatomical second connection elements. For example, the one or more non-anatomical first connection elements may, in addition or alternatively, comprise one or more receptions configured to receive one or more protrusions provided by the one or more non-anatomical second connection elements.

For example, the one or more non-anatomical first connection elements comprise one or more first protrusions configured to be inserted into one or more second receptions comprised by the one or more non-anatomical second connection elements.

For example, the one or more non-anatomical first connection elements comprise one or more first receptions configured to receive one or more second protrusions comprised by the one or more non-anatomical second connection elements.

For example, the 3D digital tissue model is provided with one or more non-anatomical lateral protrusions. The one or more non-anatomical lateral protrusions are configured to bridge one or more undercuts of the one or more artificial gingiva parts of the 3D digital denture model arranged on the 3D digital tissue model. Examples may have the beneficial effect that bridging undercuts, may allow to provide the 3D digital matrix model with a simpler 3D geometry. For example, the 3D digital matrix model may be configured without inner protrusion extending into any undercut of the one or more artificial gingiva parts of the 3D digital denture model. Thus, the 3D digital matrix model may be easier pulled off the 3D digital denture model. Consequently, the physical casting matrix manufactured using the 3D digital matrix model as a template may be pulled off the physical tissue model manufactured using the 3D digital tissue model as a template easier as well.

The one or more non-anatomical lateral protrusions may, e.g., extend in oral direction. The one or more non-anatomical lateral protrusions may, e.g., extend in vestibular direction.

For example, the 3D digital matrix model is provided in a two-part form comprising a vestibular part and an oral part. The labial and oral parts are configured to establish a non-destructive detachable connection each other. Examples may have the beneficial effect that the 3D digital matrix model in the two-part form may be removed from the 3D digital denture model by detaching the connection between the vestibular part and an oral part of the 3D digital matrix model. The 3D digital matrix model thus may be easily split facilitating its removal from the 3D digital denture model.

The resulting casting matrix manufactured using the 3D digital matrix model as a template may thus be provided in a two-part form as well comprising a vestibular part and an oral part. The labial and oral parts are configured to establish a non-destructive detachable connection each other. Thus, the casting matrix in the two-part form may, e.g., be removed from the denture model by detaching the connection between the vestibular part and an oral part of the casting matrix. The casting matrix thus be easily split facilitating its removal from the removable denture.

For example, the vestibular part comprises one or more third connection elements for establishing the detachable connection. The oral part comprises one or more fourth connection elements configured for establishing the detachable connection.

For example, the one or more third connection elements comprise one or more third protrusions configured to be inserted into one or more fourth receptions comprised by the one or more fourth connection elements. Additionally or alternatively, the one or more third connection elements may comprise one or more third receptions configured to receive one or more fourth protrusions comprised by the one or more fourth connection elements.

Examples may have the beneficial effect that by using the third and fourth connection elements, which may be non-anatomical connection elements, the vestibular part and an oral part of the 3D digital matrix model may be effectively connectable in order to provide a stable non-destructive detachable connection between the both during the casting of the one or more artificial gingiva parts of the removal denture. Thus, the vestibular part and an oral part of the physical casting matrix manufactured using the 3D digital matrix model as a template may as well comprise third and fourth connection elements, which may be non-anatomical connection elements, enabling a stable non-destructive detachable connection between the both during the casting of the one or more artificial gingiva parts of the removal denture.

For example, the 3D digital matrix model comprises one or more additional clamping elements. The clamping elements are configured to span round the vestibular part and the oral part exerting a clamping force pressing the vestibular part and the oral part against each other.

Examples may have the beneficial effect that by using the additional clamping elements the vestibular part and the oral part of the 3D digital matrix model may be effectively connectable in order to provide a stable non-destructive detachable connection between the both during the casting of the one or more artificial gingiva parts of the removal denture.

The physical casting matrix manufactured using the 3D digital matrix model as a template may as well comprise one or more additional clamping elements enabling a stable non-destructive detachable connection between the vestibular part and the oral part of the casting matrix during the casting of the one or more artificial gingiva parts of the removal denture.

Thus, the resulting casting matrix may thus comprise one or more additional clamping elements. The clamping elements are configured to span round the vestibular part and the oral part exerting a clamping force pressing the vestibular part and the oral part against each other.

For example, the vestibular part and the oral part of the casting matrix may be manufactured using the same material.

For example, the vestibular part of the casting matrix is manufactured using a first material. The oral part of the casting matrix is manufactured using a second material. One of the two materials being more rigid than the other one. Examples may have the beneficial effect that by using one material which is more flexible, i.e., less rigid, while the other material is less flexible, i.e., more rigid, removing the casting matrix from the removable denture may be facilitated. The more flexible material may be easier detachable from the less flexible material and, due to its flexibility, easier removable from the removable denture. At the same time the less flexible material may provide more stability to the casting matrix during casting. Thus, stability during casting as well as removability after casting may both be implemented.

For example, the method further comprises generating at least one 3D digital shell model of a mantle shell for the casting matrix. The 3D digital shell is a negative of an outer 3D geometrical form of the 3D digital matrix model. The mantle shell is configured to be slipped over the casting matrix providing structural support to the casting matrix. The 3D digital shell model is provided as a template for manufacturing the mantle shell. Examples may have the beneficial effect that the mantle shell may be used to provide stability to the casing matrix.

The shell mantle may, e.g., be manufactured from a material more rigid than a material, from which the casting matrix is manufactured. The inner surfaces of the mantle shell in contact with the outer surfaces of the casting matrix may have a simpler 3D geometry than the inner surfaces of the casting matrix in contact with outer surfaces of the removable denture and the tissue model or natural tissue. The simpler 3D geometry, e.g., with straight faces, may facilitate a removal of the mantle shell from the casting matrix, despite of its more rigid material. The more flexible material of the casting matrix may facilitate a removal of the casting matrix from the removable denture and the tissue model or natural tissue, despite of its more complex geometry.

For example, the 3D digital shell model of the mantle shell provides a reception for receiving the casting matrix. The reception of the mantle shell comprises straight internal side-faces. The casting matrix comprises straight external side-faces in contact with the straight internal side-faces of the mantle shell, when the mantle shell is slipped over the casting matrix. Examples may have the beneficial effect that the straight internal side-faces of the mantle shell may facilitate a removal from the casting matrix with the straight external side-faces.

For example, the reception of the 3D digital shell model of the mantle shell comprises a U-shaped cross section. The outer 3D geometrical form of the 3D digital matrix model comprises a matching U-shaped cross section.

For example, the method further comprises manufacturing the mantle shell using the 3D digital shell model as template. The manufactured mantle shell is a physical copy of the respective template. Examples may have the beneficial effect of providing a mantle shell to be used together with the casting matrix for manufacturing the removable denture.

For example, the mantle shell is manufactured using one of the following: machining, 3D printing, casting. For example, the mantle shell may be manufactured using a machining device configured to manufacture the mantle shell by processing a blank to provide a casting model with a 3D geometry defined by the 3D digital shell model. For example, the mantle shell may be manufactured using a 3D printing device, i.e., printer, configured to print mantle shell with a 3D geometry defined by the 3D digital shell model. For example, the 3D digital shell model may be used as a positive to define a negative of the mantle shell in form of a negative 3D digital shell model. The negative 3D digital shell model may, e.g., be used to manufacture, e.g., using machining or 3D printing, a matrix for casting the mantle shell, which may then be used in combination with the casting matrix defined by the 3D digital matrix model to cast the one or more artificial gingiva parts of the removable denture defined by the 3D digital denture model.

For example, the mantle shell is manufactured using a material which is more rigid than a material used for manufacturing the casting matrix. Examples may have the beneficial effect that the mantle shell may provide stability to the casting matrix, while the casting matrix due to its higher flexibility is easier removable from the removable denture.

For example, the 3D digital shell model comprises one or more injection channels configured for inserting the casting material by injecting the casting material into the one or more recesses of the 3D digital matrix model, over which the 3D digital shell model is slipped. The injection channels of the 3D digital shell model may be aligned with the injection channels of the 3D digital matrix model. Examples may have the beneficial effect that the injection channels of the 3D digital shell model may facilitate injecting the casting material into the 3D digital matrix model.

The resulting mantle shell may thus comprise one or more injection channels configured for inserting the casting material by injecting the casting material into the one or more recesses of the casting matrix, over which the mantle shell is slipped. The injection channels of the mantle shell may be aligned with the injection channels of the casting model. For injecting the casting material, an injection device may be used, e.g., a reciprocating pump, like a syringe. The injection channels may each, e.g., comprise a mouth. The mouths of the injection channels may, e.g., be arranged on an occlusal side of the mantle shell.

For example, the 3D digital shell model comprises one or more venting channels configured for letting out air form the one or more recesses, when the casting material is injected into the one or more recesses of the 3D digital matrix model, over which the 3D digital shell mode is slipped. The venting channels of the 3D digital shell model may be aligned with the venting channels of the 3D digital matrix model. Examples may have the beneficial effect that the venting channels may ensure an effective venting of the casting matrix manufactured using the 3D digital matrix model as a template, when the casting material being injected into the casting matrix generates an overpressure within the casting matrix relative to the environment of the casting matrix.

The resulting mantle shell may thus comprise one or more venting channels configured for letting out air form the one or more recesses, when the casting material is inserted, e.g., injected, into the one or more recesses of the casting matrix, over which the mantle shell is slipped. The venting channels of the mantle shell may be aligned with the venting channels of the casting model. The mouths of the injection channels may, e.g., be arranged on an occlusal side of the mantle shell.

For example, the one or more receptions of the one or more recesses of the 3D digital casting model for receiving the one or more artificial teeth of the removable denture each comprises a through-hole for inserting an attachment element for attaching the artificial teeth to the 3D digital casting model.

The one or more receptions of the one or more recesses of the resulting casting matrix for receiving the one or more artificial teeth of the removable denture may thus each comprise a through-hole for inserting an attachment element for attaching the artificial teeth to the casting matrix. Examples may have the beneficial effect of enabling an effective attaching of the one or more artificial teeth to the casting matrix, within which artificial teeth are arranged. The attaching may prevent any dislocating of the artificial teeth during the arranging of the casting matrix on the tissue model or the natural tissue. Furthermore, the attaching may prevent any dislocating of the artificial teeth during the casting of the one or more artificial gingiva parts.

For example, the removable denture is one of the following: a removable partial denture, a removable full denture.

For example, the 3D digital tissue model comprising one of the following: a 3D digital mandibular tissue model of a mandibular jaw, a 3D digital maxillary model of a maxillary jaw. The removable denture may be a removable denture for the mandibular jaw or for the maxillary jaw. The casting matrix may be configured for casting one or more artificial gingiva parts of mandibular denture. The casting matrix may be configured for casting one or more artificial gingiva parts of maxillary denture. For example, the removable denture may comprise a mandibular part and a maxillary part. For example, the casting matrix may comprise a mandibular part and a maxillary part for casting artificial gingiva parts of the mandibular denture and the maxillary denture.

For example, each of the jaws is one of the following: a partially edentulous jaw comprising one or more teeth, a completely edentulous jaw.

In another aspect, the invention relates to a computer program product for providing a template for a casting matrix configured for casting one or more artificial gingiva parts of a removable denture. The casting matrix comprises one or more recesses. Each of the recesses has a 3D geometric form, which is a negative of a 3D geometric form of a section of the removable denture with one of the artificial gingiva parts to be casted. The computer program product comprises a computer readable storage medium having program instructions embodied therewith.

The program instructions being executable by a processor of a computer device to cause the computer device to provide a 3D digital tissue model of tissue of an oral cavity of a patient on which the removable denture is to be arranged. A 3D digital denture model of the removable denture is provided using the 3D digital tissue model. The removable denture comprises one or more artificial teeth arranged within the one or more artificial gingiva parts arranged on the 3D digital tissue model. The 3D digital tissue model and the 3D digital denture model are used for generating a 3D digital matrix model of the casting matrix. The 3D digital matrix model envelops the one or more sections of the 3D digital denture model with the one or more artificial gingiva parts arranged on the 3D digital tissue model. The 3D digital matrix model is provided as template for manufacturing the casting matrix.

The program instructions provided by the computer program product may be configured for causing the computer device to execute any of the aforementioned methods for providing a template for a casting matrix.

In another aspect, the invention relates to a computer device for providing a template for a casting matrix configured for casting one or more artificial gingiva parts of a removable denture. The casting matrix comprises one or more recesses. Each of the recesses has a 3D geometric form, which is a negative of a 3D geometric form of a section of the removable denture with one of the artificial gingiva parts to be casted. The computer device comprises a processor and a memory storing program instructions executable by the processor.

Execution of the program instructions by the processor causes the computer device to provide a 3D digital tissue model of tissue of an oral cavity of a patient on which the removable denture is to be arranged. A 3D digital denture model of the removable denture is provided using the 3D digital tissue model. The removable denture comprises one or more artificial teeth arranged within the one or more artificial gingiva parts arranged on the 3D digital tissue model. The 3D digital tissue model and the 3D digital denture model are used for generating a 3D digital matrix model of the casting matrix. The 3D digital matrix model envelops the one or more sections of the 3D digital denture model with the one or more artificial gingiva parts arranged on the 3D digital tissue model. The 3D digital matrix model is provided as template for manufacturing the casting matrix.

The computer device may be configured for executing any of the aforementioned methods for providing a template for a casting matrix.

In another aspect, the invention relates to a manufacturing system comprising the computer device for providing a template for a casting matrix configured for casting one or more artificial gingiva parts of a removable denture. The manufacturing system further comprises a manufacturing device configured to manufacture the casting matrix. Execution of the program instructions by the processor further causes the computer device to control the manufacturing device to manufacture the casting matrix using the 3D digital matrix model as the template. The manufactured casting matrix is a physical copy of the respective template.

The manufacturing device may be configured for manufacturing any of the aforementioned examples of a casting matrix.

For example, the manufacturing device is one of the following: a machining device, a 3D printing device.

In another aspect, the invention relates to a machined or 3D printed casting matrix configured for casting one or more artificial gingiva parts of a removable denture. The casting matrix comprises one or more recesses. Each of the recesses has a 3D geometric form, which is a negative of a 3D geometric form of a section of the removable denture with one of the artificial gingiva parts to be casted. The casting matrix is configured for being arranged on at least one of the following: tissue of an oral cavity of a patient on which the removable denture is to be arranged, on a tissue model of the tissue of the oral cavity of the patient on which the removable denture is to be arranged.

The casting matrix may, e.g., be a machined or 3D printed casting matrix. For example, each of the recesses may comprise one or more receptions for receiving one or more artificial teeth of the removable denture.

The casting matrix may be any of the aforementioned examples of a casting matrix. The casting matrix may be manufactured using any of the aforementioned examples of a method for providing a template for a casting matrix.

The above-described examples and embodiments may be combined freely as long as the combinations are not mutually exclusive.

In the following, embodiments of the invention are described in greater detail in which FIG. 1 shows an exemplary 3D digital denture model and a 3D digital tissue model;

In the following similar features are denoted by the same reference numerals.

Figure 1:
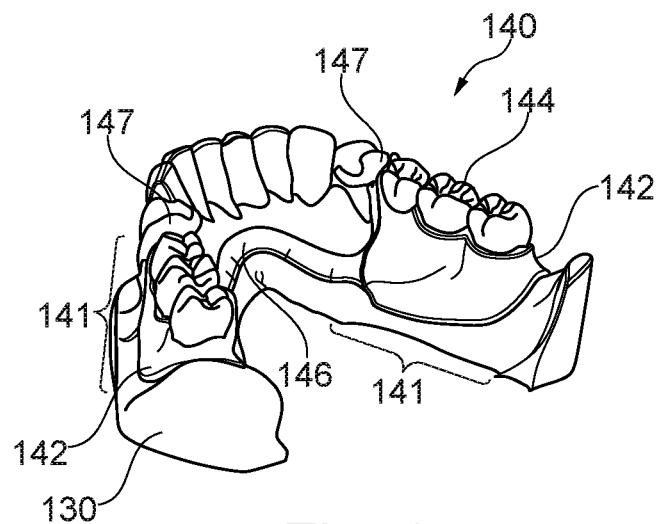

FIG. 1 shows an exemplary 3D digital denture model 140 arranged on an exemplary 3D digital tissue model 130. The 3D digital denture model 140 comprises two sections 141 with artificial gingiva parts 142. The artificial gingiva parts 142 are shaped and colored to mimic the patient's natural gingiva. Within each of the artificial gingiva parts 142 a plurality of artificial teeth 144 is arranged. The 3D digital denture model 140 further comprises supporting framework 146. The supporting framework 146 is configured for supporting the artificial teeth 144 and stabilizing the removable denture defined by the 3D digital denture model 140. The supporting framework 146 comprises clasps 147 configured for retaining the removable denture at natural teeth of the patient resembled by the 3D digital tissue model 130.

The 3D digital tissue model 130 may be provided and the 3D digital denture model 140 may be generated on the 3D digital tissue model 130 taking into account individual anatomical features of the patient as defined by the 3D digital tissue model 130. The 3D digital tissue model 130 may, e.g., be provided using scan data of the patient's oral cavity. For example, the patient's tissue in the oral cavity may be scan using a scanner, e.g., an optical scanner. The achieved scan data may be used to generate and provide the 3D digital tissue model 130. Alternatively, an impression of the patient's tissue in the oral cavity, i.e., a negative imprint of hard and soft tissue may be taken. Either this impression may be scanned, e.g., using an optical scanner or the negative imprint provided by the impression may be used to generate a positive reproduction of the patient's tissue, i.e., a 3D physical tissue model or cast, which is scanned, e.g., by the optical scanner to provide the scan data used to generate the 3D digital tissue model 130.

Figure 2:
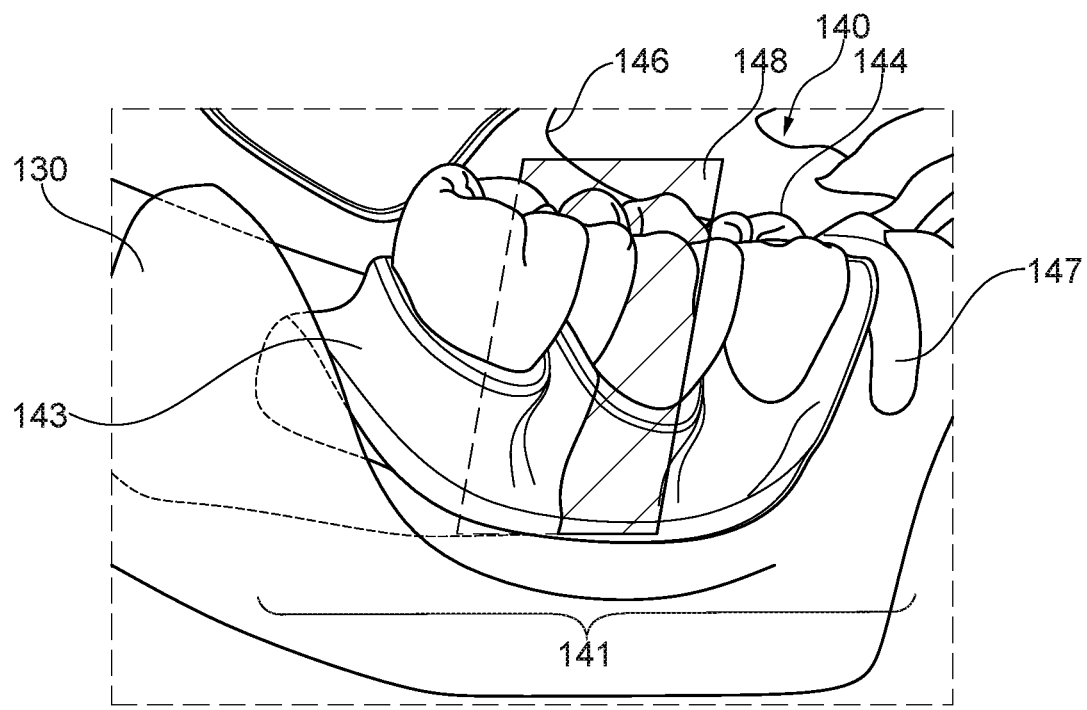
FIG. 2 shows a part of an exemplary 3D digital denture model and a 3D digital tissue model.

FIG. 2 shows a detailed view of a section 141 of a 3D digital denture model 140 arranged on the 3D digital tissue model 130. Section 141 comprises an artificial gingiva, which is an upper artificial gingiva part 143 extending over the supporting framework 146 of the 3D digital denture model 140. The supporting framework 146 is retainable at a natural tooth of the patient resembled by the 3D digital tissue model 130 using a clasp 147. Within this upper gingiva part 143 a plurality of artificial teeth 144 is arranged. Such an upper artificial gingiva part 143 may, e.g., be manufactured using a CAD/CAM method, like machining or 3D printing. Furthermore, a sectional plane 148 extending perpendicularly through the section 141 of the 3D digital denture model 140 is indicated.

Figure 3:
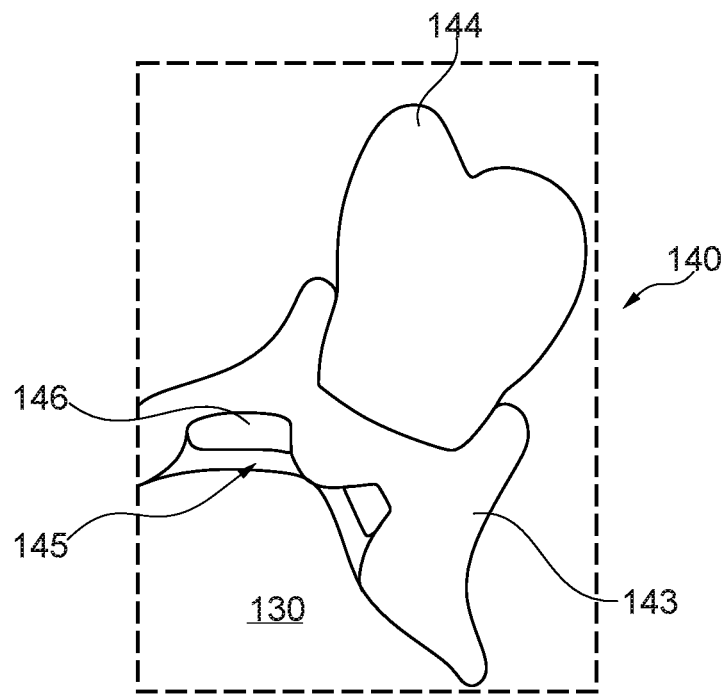
FIG. 3 shows a cross-sectional view of a sectional plane through a part of the 3D digital denture model.

FIG. 3 shows a cross-sectional view of a sectional plane 148 through section 141 of the 3D digital denture model 140 and the 3D digital tissue model 130 of FIG. 2. The upper artificial gingiva part 143 extends over and laterally along the supporting framework 146 of the 3D digital denture model 140. Artificial teeth 144 are arranged within the upper artificial gingiva part 143. Manufacturing the upper artificial gingiva part 143 using methods like machining or 3D printing may result in one or more hollow sections 145 below the supporting framework 146. In order to be able to fill these hollow sections 145 an alternative method may be used to manufacture artificial gingiva parts enveloping the supporting framework 146 or to complete the upper artificial gingiva part 143 with a lower artificial gingiva part extending below the supporting framework 146 such that the resulting combination of upper and lower artificial gingiva part envelope the supporting framework 146.

Figure 4:
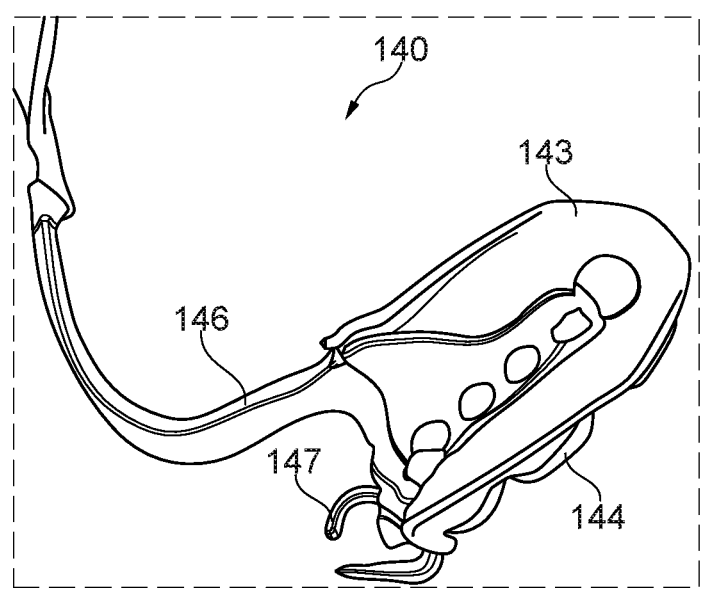
FIG. 4 shows a part of the exemplary 3D digital denture model of FIG. 2.

FIG. 4 shows the section 141 of the 3D digital denture model 140 of FIG. 2 from below without the 3D digital tissue model 130. Artificial teeth 144 are arranged within the upper artificial gingiva part 143. The upper artificial gingiva part 143 extends over and laterally along the supporting framework 146 of the 3D digital denture model 140. The artificial gingiva part 143 does not extend below the supporting framework 146 resulting in a hollow section below the supporting framework 146, when the removable denture defined by the 3D digital denture model 140 is arranged on the natural tissue in the oral cavity of the patient. In order to avoid such hollow sections, the artificial gingiva defined by the 3D digital denture model 140 extends below the supporting framework 146. Using a casting method for manufacturing the artificial gingiva, the artificial gingiva extending below the supporting framework 146 does not have to be defined explicitly. In may be sufficient to define the upper surface of the upper artificial gingiva part 143. This upper surface of the upper artificial gingiva part 143 may be used to define a 3D digital matrix model 100 of a casting matrix to be used for casting the artificial gingiva parts. This, casting matrix may be defined as a negative of the 3D digital denture model 140 and thus of the upper artificial gingiva part 143.

Figure 5:
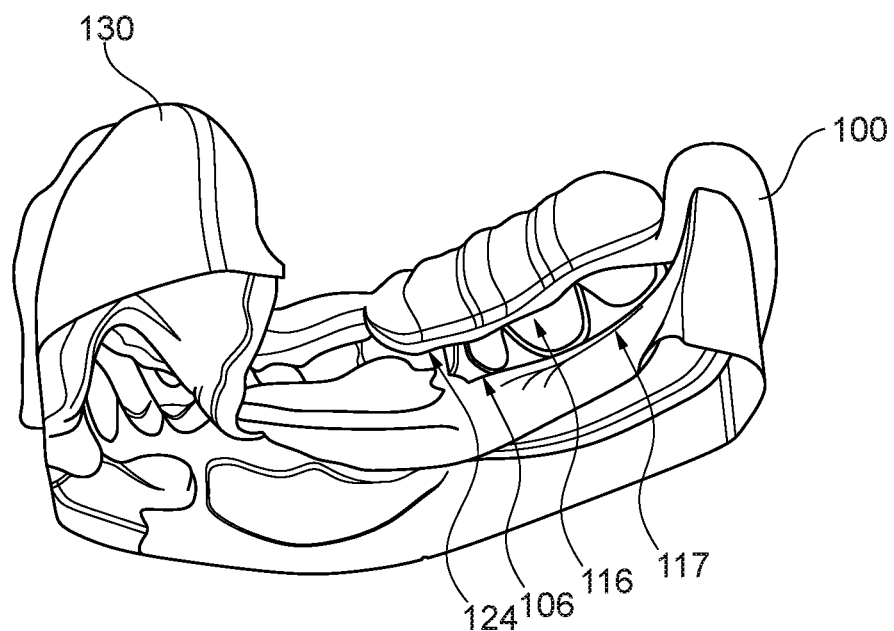
FIG. 5 shows an exemplary 3D digital matrix model and a 3D digital tissue model.

FIG. 5 shows an exemplary 3D digital matrix model 100 arranged on an exemplary 3D digital tissue model 130. As an alternative method for manufacturing the artificial gingiva parts of the removable denture defined by the 3D digital denture model 140 casting may be used. For providing a casting matrix in order to be able to cast the artificial gingiva parts, a 3D digital matrix model 100 is generated. The 3D digital matrix model 100 may be defined as a negative of a 3D digital denture model 140 arranged on the 3D digital tissue model 130. Using a casting matrix as defined by the 3D digital matrix model 100 for casting artificial gingiva parts of a removable denture may prevent hollow sections below the supporting framework, since all the free space around the supporting framework as defined by the casting matrix arranged on a tissue model or on natural tissue in an oral cavity may be filled up with casting material enveloping the supporting framework. In particular, the casting material spread below the supporting framework due to its fluidity resulting in an artificial gingiva extending below the supporting framework.

The casting matrix defined by the 3D digital matrix model 100 may comprise one or more recesses 117. The recesses 117 each have a 3D geometric form, which is a negative of a 3D geometric form of a section of the removable denture comprising an artificial gingiva part to be casted as defined by a 3D digital denture model, e.g., by 3D digital denture model 140 of FIG. 1. The recesses 117 comprising receptions 116 for receiving artificial teeth of the removable denture as defined by the 3D digital denture model. The recesses 117 may further be configured for receiving a supporting framework of the removable denture. The 3D digital matrix model 100 may further comprise positioning elements for arranging and fixating the casting matrix defined by the 3D digital matrix model 100 at a predefined position on the 3D digital tissue model 130. These positioning elements may, e.g., comprising one or more receptions 124 for receiving one or more of the natural teeth defined by the of the 3D digital tissue model 130. The 3D digital matrix model 100 as shown in FIG. 5 additionally comprises a lateral opening 106, e.g., on the oral side of the casting matrix, configured for inserting casting material into the casting matrix as defined by the 3D digital matrix model 100.

Figure 6:
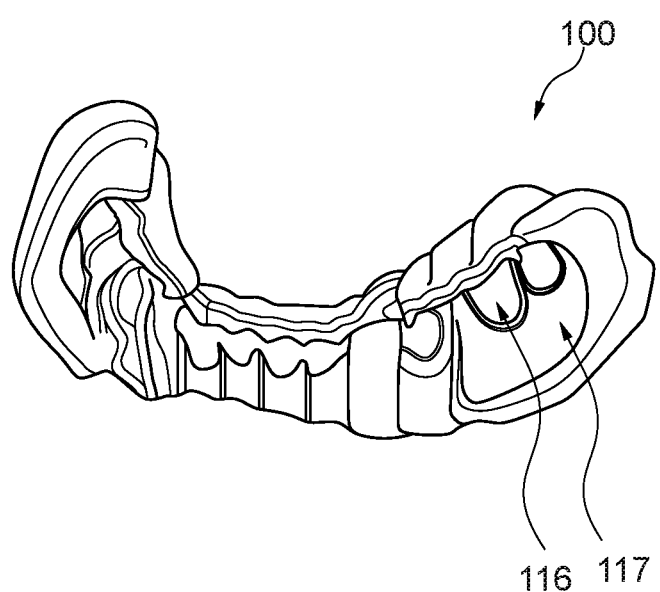
FIG. 6 shows the exemplary 3D digital matrix model.

FIG. 6 shows the exemplary 3D digital matrix model 100 of FIG. 5 without the 3D digital tissue model 130. 3D digital matrix model 100 may be used to manufacture a casting matrix for casting artificial gingiva parts of a removable denture. The casting matrix may be generated using a CAD/CAM method, e.g., machining or 3D printing.

Figure 7:
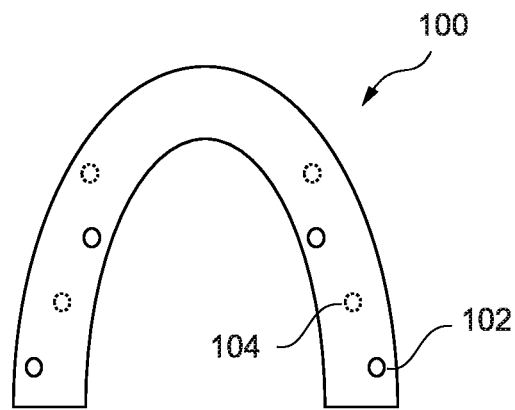
FIG. 7 shows an exemplary 3D digital matrix model with injection and venting channels.

FIG. 7 shows an exemplary 3D digital matrix model 100. The 3D digital matrix model 100 comprises injection channels 102 and venting channels 104. The 3D digital matrix model 100 is depicted from above. A casting matrix manufactured using the 3D digital matrix model 100 as a template may comprise the injection channels 102 and venting channels 104 as well.

The injection channels 102 are configured for injecting casting material into the recesses of the casting matrix defined by the 3D digital matrix model 100. For injecting the casting material, an injection device may be used, e.g., a reciprocating pump, like a syringe. The injection channels 102 may each, e.g., comprise a mouth arranged on an occlusal side of the casting matrix as shown in FIG. 7.

The venting channels 104 are configured for letting out air form the recesses of the casting matrix defined by the 3D digital matrix model 100, when the casting material is injected via the injection channels 102. The venting channels 102 may ensure an effective venting of the casting matrix, when the casting material being injected into the casting matrix generates an overpressure within the casting matrix relative to the environment of the casting matrix.

Figure 8:
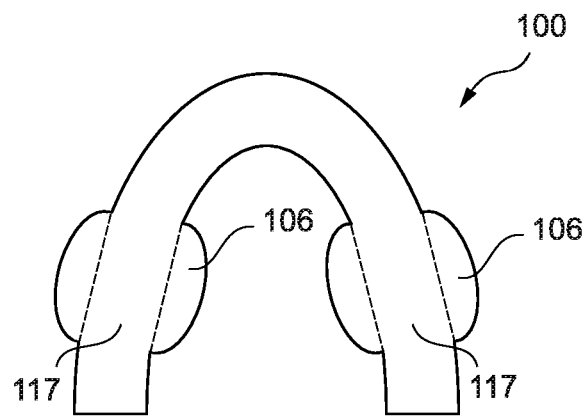
FIG. 8 shows an exemplary 3D digital matrix model with openings for inserting casting material.

FIG. 8 shows a 3D digital matrix model 100 with openings 106 for inserting casting material into the casting matrix. The 3D digital matrix model 100 is depicted from below. A 3D digital matrix model 100 may, e.g., have more or less openings 106 than shown in FIG. 8. The openings may be arranged laterally, e.g., orally or vestibulary, on a lower side of the 3D digital matrix model 100. The openings 106 are openings between boundaries of the recesses 117 of the 3D digital matrix model 100 arranged on a 3D digital tissue model and the 3D digital tissue model. The openings may facilitate inserting the casting material into the casting matrix defined by the 3D digital matrix model 100, when the casting matrix is arranged on a 3D digital tissue model. The casting material may, e.g., be poured into the casting matrix via the openings 106.

Figure 9:
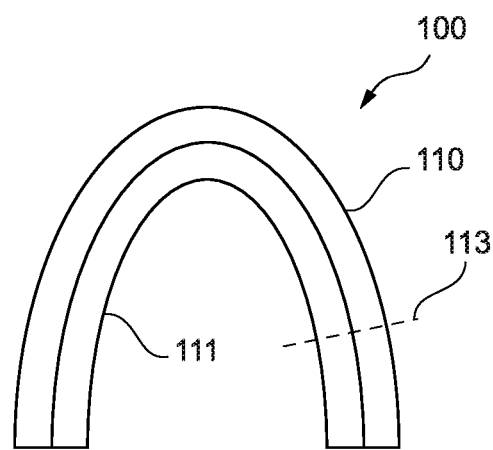
FIG. 9 shows an exemplary 3D digital matrix model in a two-part form.

FIG. 9 shows a 3D digital matrix model 100 in a two-part form comprising a vestibular part 110 and an oral part 111. For example, the vestibular part 110 and the oral part 111 may be manufactured using different materials. The vestibular part 110 may be manufactured using a first material. The oral part 111 may be manufactured using a second material. One of the two materials may, e.g., be more rigid than the other one. Using a more flexible and a less flexible material may facilitate removing the casting matrix defined by the 3D digital matrix model 100 from the removable denture. The more flexible material may be easier detachable from the less flexible material and, due to its flexibility, easier removable from the removable denture. At the same time the less flexible material may provide more stability to the casting matrix during casting of the artificial gingiva parts. Thus, stability during casting as well as removability after casting may both be implemented. For example, the vestibular part 110 may be more flexible than the oral part 111. For example, the oral part 111 may be more flexible than the vestibular part 110. Furthermore, a sectional plane 113 extending perpendicularly through the vestibular part 110 and the oral part 111 of the 3D digital matrix model 100 is indicated.

Figure 10:
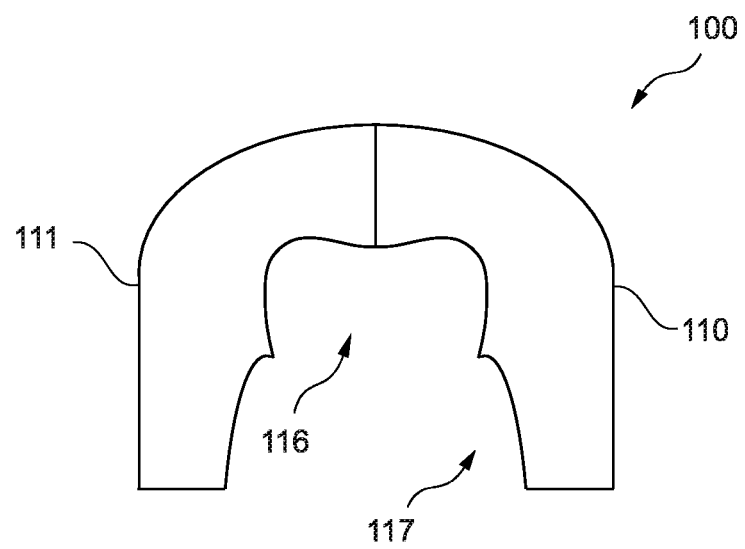
FIG. 10 shows a cross-sectional view of a sectional plane through a 3D digital matrix model.

FIG. 10 shows a cross-sectional view of sectional plane 113 of FIG. 9, through the 3D digital matrix model 100. The 3D digital matrix model 100 defines a casting matrix in a two-part form comprising the vestibular part 110 and the oral part 111. The vestibular part 110 and the oral part 111 may be non-destructive detachable from each other. Between the vestibular part 110 and the oral part 111 the recesses 117 with the receptions 116 for the artificial teeth of the removable denture are defined.

Figure 11:
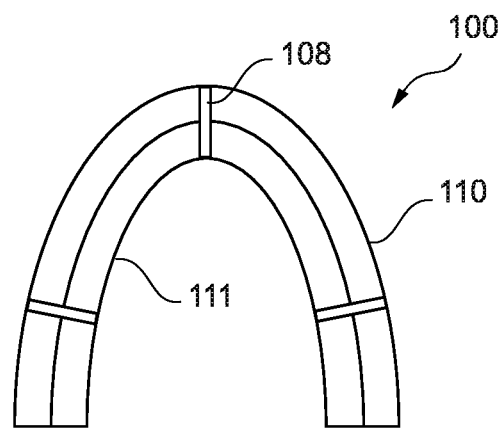
FIG. 11 shows an exemplary 3D digital matrix model in a two-part form with additional clamping elements.

FIG. 11 shows a 3D digital matrix model 100 in a two-part form with additional clamping elements 108. The clamping elements 108 are configured to span round the vestibular part 110 and the oral part 111 exerting a clamping force pressing the vestibular part 110 and the oral part 111 against each other. Thus, a non-destructive detachable connection between the vestibular part 110 and the oral part 111 may be established. After removal of the clamping elements 108, the casting matrix defined by the 3D digital matrix model 100 may easily be split into the two parts, i.e., the vestibular part 110 and the oral part 111. The splitting may facilitate a removal of the casting matrix defined by the 3D digital matrix model 100 from the denture model after the casting material is cured. The clamping elements 108 may ensure a stable non-destructive detachable connection between the vestibular part 110 and the oral part 111 during the casting of the artificial gingiva parts of the removal denture.

Figure 12:
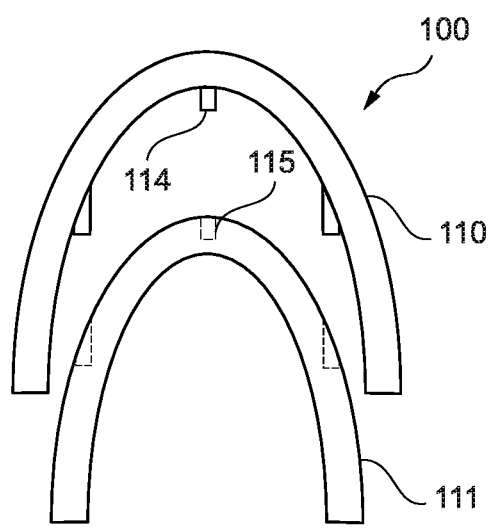
FIG. 12 shows two-parts of an exemplary 3D digital matrix model in a two-part form.

FIG. 12 shows two-parts 100, 111 of a 3D digital matrix model 100 in a two-part form, which are disassembled. The vestibular part 110 comprises connection elements 114 for establishing a detachable connection with the oral part 111. The oral part 111 comprises connection elements 115 for establishing the detachable connection with the vestibular part 110. In the example of FIG. 12, the connection elements 114 of the vestibular part 110 are provided in form of protrusions configured to be received by the connection elements 115 of the oral part 111, which are provided in form of receptions configured to receive the protrusions 114.

Figure 13:
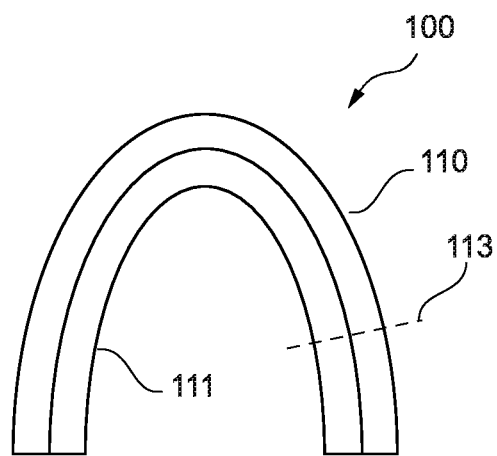
FIG. 13 shows the exemplary 3D digital matrix model of FIG. 11 being assembled.

FIG. 13 shows the exemplary 3D digital matrix model 100 of FIG. 11 with the vestibular part 110 and the oral part 111 being assembled using the connecting connection elements 114, 114. Furthermore, a sectional plane 113 extending perpendicularly through the vestibular part 110 and the oral part 111 of the 3D digital matrix model 100 is indicated.

Figure 14:
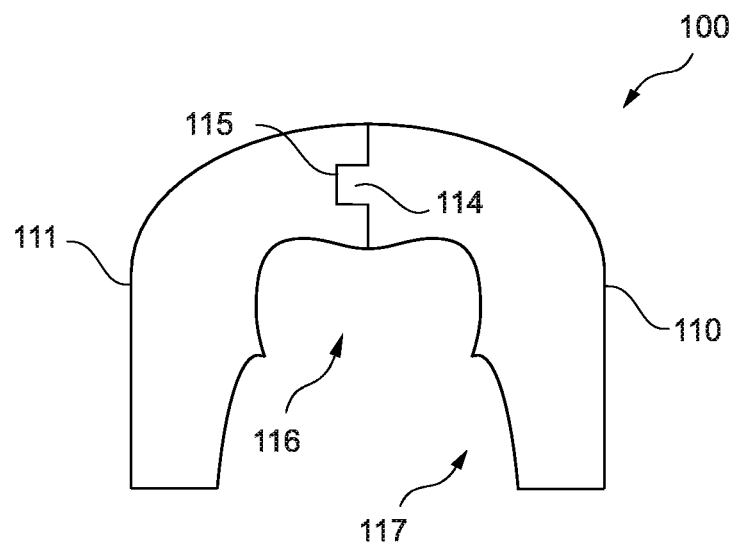
FIG. 14 shows a cross-sectional view of a sectional plane through a 3D digital denture model.

FIG. 14 shows a cross-sectional view of the sectional plane 113 through the 3D digital denture model 100 of FIG. 13. The connection element 114 of the vestibular part 110 in form of a protrusion is received by the connection elements 115 of the oral part 111 in form of a reception. Between the non-destructive detachable vestibular part 110 and oral part 111 of the 3D digital denture model 100, the recesses 117 with the receptions 116 for the artificial teeth of the removable denture are defined.

Figure 15:
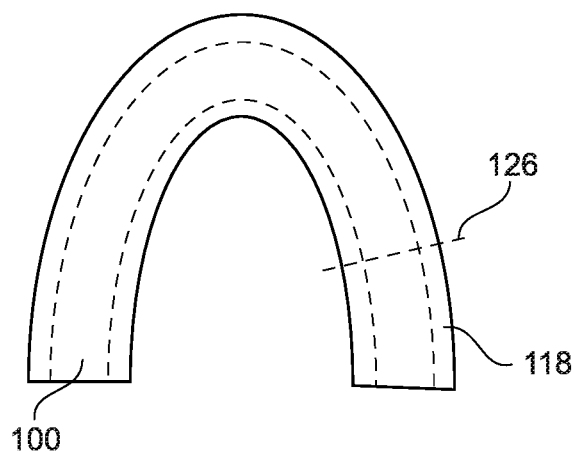
FIG. 15 shows an exemplary 3D digital shell model.

FIG. 15 shows a 3D digital shell model 118 of a mantle shell for a casting matrix defined by a 3D digital matrix model 100. The 3D digital shell model 118 is a negative of an outer 3D geometrical form of the 3D digital matrix model 100. The mantle shell defined by the 3D digital shell model 118 is configured to be slipped over the casting matrix defined by the 3D digital matrix model 100. The mantle shell may provide structural support to the casting matrix. The shell mantle may, e.g., be manufactured from a material more rigid than a material, from which the casting matrix is manufactured. The inner surfaces of the 3D digital shell model 118 configured to be in contact with the outer surfaces of the 3D digital matrix model 100 may have a simpler 3D geometry than the inner surfaces of the 3D digital matrix model 100 configured for providing the 3D geometry of the artificial gingiva parts of the removable denture to be casted. The simpler 3D geometry, e.g., with straight faces, may facilitate a removal of the mantle shell defined by the 3D digital shell model 118 from the casting matrix defined by the 3D digital matrix model 100, despite of its more rigid material. The more flexible material of the casting matrix may facilitate a removal of the casting matrix defined by the 3D digital matrix model 100 from the removable denture and the tissue model or natural tissue, despite of its more complex geometry. Furthermore, a sectional plane 126 extending perpendicularly through the 3D digital shell model 118 and the 3D digital matrix model 100 is indicated.

Figure 16:
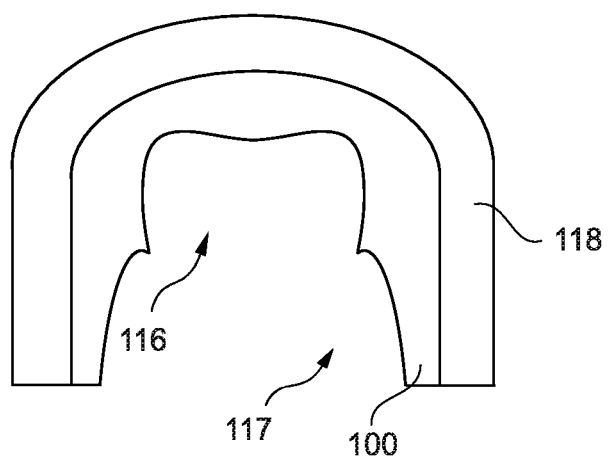
FIG. 16 shows a cross-sectional view of a sectional plane through a 3D digital shell model and an exemplary 3D digital matrix model.

FIG. 16 shows a cross-sectional view of a sectional plane 126 of FIG. 15 through the 3D digital shell model 118 and the 3D digital matrix model 100. The 3D digital shell model 118 provides a reception for receiving the casting matrix defined by the 3D digital matrix model 100. The reception of the mantle shell may comprise straight internal side-faces. The casting matrix may comprise straight external side-faces in contact with the straight internal side-faces of the mantle shell, when the mantle shell is slipped over the casting matrix.

For example, the reception of the 3D digital shell model 118 may have a U-shaped cross section as depicted in FIG. 16. The outer 3D geometrical form of the 3D digital matrix model 100 may comprise a matching U-shaped cross section.

For example, the mantle shell defined by the 3D digital shell model 118 is manufactured using a material which is more rigid than a material used for manufacturing the casting matrix defined by the 3D digital matrix model 100. Thus, the mantle shell may provide stability to the casting matrix, while the casting matrix due to its higher flexibility is easier removable from the removable denture.

Figure 17:
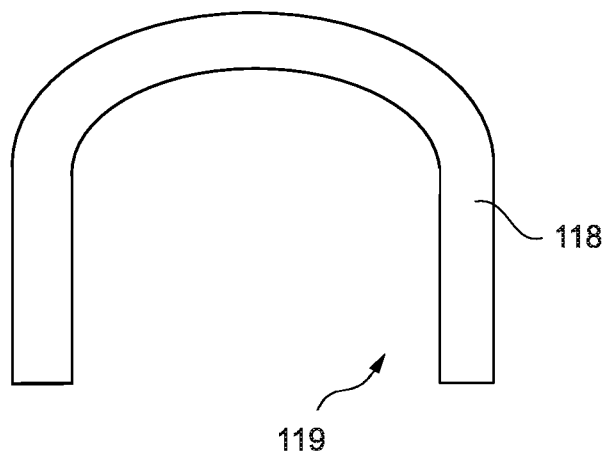
FIG. 17 shows a cross-sectional view of a sectional plane through a 3D digital shell model.

FIG. 17 shows a cross-sectional view of a sectional plane through the 3D digital shell model 118 without a 3D digital matrix model 100. The 3D digital shell model 118 may comprise a reception 119 with a U-shaped cross section configured for receiving casting matrix as defined by a 3D digital matrix model 100.

Figure 18:
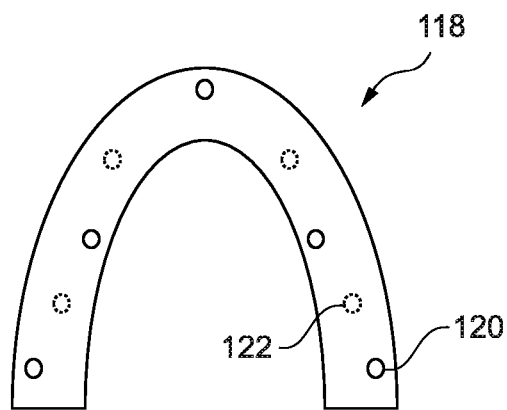
FIG. 18 shows an exemplary 3D digital shell model with injection and venting channels.

FIG. 18 shows a 3D digital shell model 118 with injection channels 120 and venting channels 122. The injection channels 120 are configured for injecting casting material into the recesses of a 3D digital matrix model 100, over which the 3D digital shell model 118 may be slipped. The injection channels 120 of the 3D digital shell model 118 may be aligned with injection channels of the 3D digital matrix model 100. The injection channels 120 of the 3D digital shell model 118 may facilitate injecting the casting material via a mantle shell as defined by the 3D digital shell model 118 into a casting matrix as defined by the 3D digital matrix model 100.

For injecting the casting material via the injection channels 120, an injection device may be used, e.g., a reciprocating pump, like a syringe. The injection channels 120 may each comprise a mouth, e.g., arranged on an occlusal side of the mantle shell defined by the 3D digital shell model 118.

The venting channels 122 may be configured for letting out air form the recesses of the casting matrix defined by the 3D digital matrix model 100, when casting material is injected into the recesses of the casting matrix, over which the mantle shell defined by the 3D digital shell mode is slipped. The venting channels 122 of the 3D digital shell model 118 may be aligned with the venting channels of the 3D digital matrix model 100. Thus, an effective venting of the casting matrix manufactured using the 3D digital matrix model 100 as a template may be ensured, when the casting material being injected into the casting matrix generates an overpressure within the casting matrix relative to the environment of the casting matrix. The venting channels 122 of the mantle shell defined by the 3D digital shell model 118 may be aligned with the venting channels of the casting model defined by the 3D digital matrix model 100. Mouths of the injection channels 122 may, e.g., be arranged on an occlusal side of the mantle shell.

Figure 19:
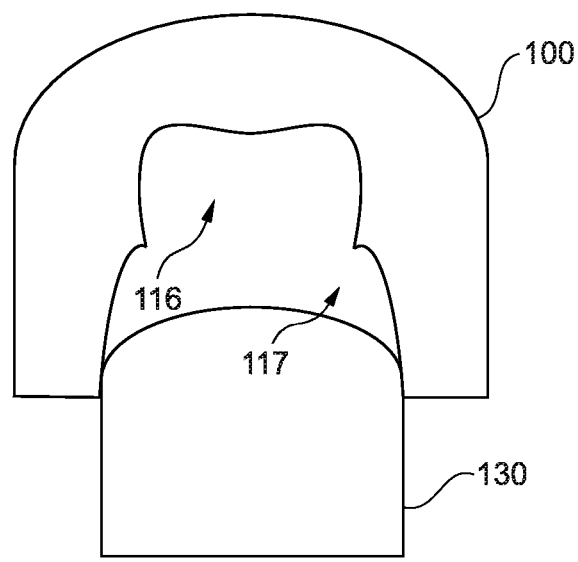
FIG. 19 shows a cross-sectional view of a sectional plane through a 3D digital matrix model and a 3D digital tissue model.

FIG. 19 shows a cross-sectional view of a 3D digital matrix model 100 arranged on a 3D digital tissue model 130. Between the 3D digital matrix model 100 and the 3D digital tissue model 130 the recess 117 builds a hollow section, which may be filled with the casting material in order to cast artificial gingiva sections of the removable denture. For example, artificial teeth of the removable denture may be arranged within receptions 116 of the recess 117 and/or a supporting framework of the removable denture may be arranged within the recess 117. The remaining free space within the recess 117 may provide a form of the artificial gingiva sections being casted.

Figure 20:
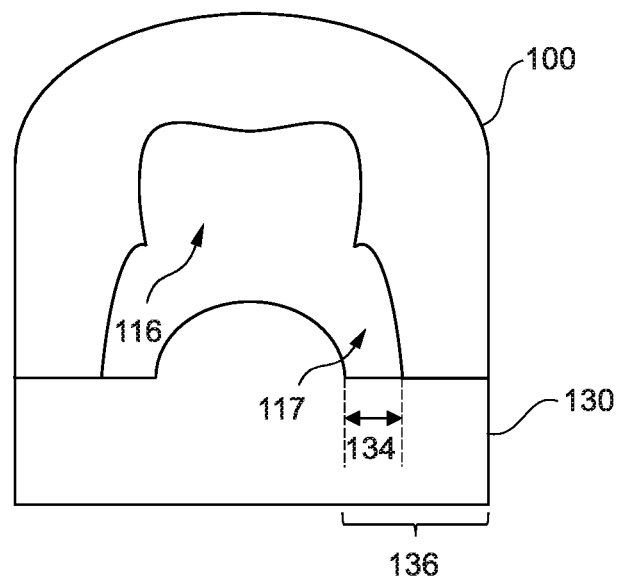
FIG. 20 shows a cross-sectional view of a sectional plane through a 3D digital matrix model and a 3D digital tissue model.

FIG. 20 shows a cross-sectional view of a 3D digital matrix model 100 and a 3D digital tissue model 130. The 3D digital tissue model 130 compromises an additional non-anatomical lateral protrusion 136. For example, the 3D digital tissue model 130 may comprise lateral protrusion 136 an oral as well as a vestibular side. For example, the lateral protrusion 136 may extend circumferential around the 3D digital tissue model 130. The lateral protrusion 136 may be configured to bridge an undercut of the artificial gingiva parts to be casted.

Thus, the 3D digital denture model 100 does not have to extend below the artificial gingiva parts to be casted. Thus, the 3D digital matrix model 100 may be easier pulled off the 3D digital denture model 130. Consequently, the physical casting matrix manufactured using the 3D digital matrix model 100 as a template may be pulled off the 3D digital denture model 130 after curing of the casting material easier as well, since the casting matrix does not comprise protrusions extending below the casted artificial gingiva parts.

Figure 21:
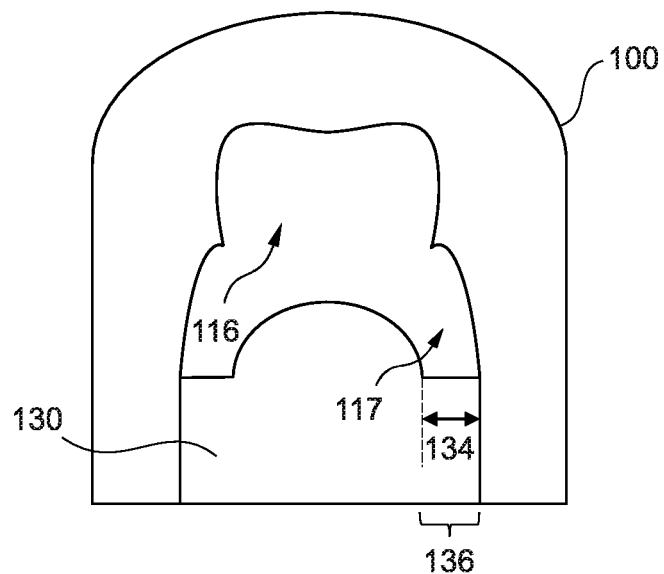
FIG. 21 shows a cross-sectional view of a sectional plane through a 3D digital matrix model and a 3D digital tissue model.

FIG. 21 shows a cross-sectional view of a sectional plane through a 3D digital matrix model 100 and a 3D digital tissue model 130. Like the 3D digital tissue model 130 shown in FIG. 20, the 3D digital tissue model 130 shown in FIG. 21 comprises an additional non-anatomical lateral protrusion 136. For example, the 3D digital tissue model 130 may comprise lateral protrusion 136 an oral as well as a vestibular side. For example, the lateral protrusion 136 may extend circumferential around the 3D digital tissue model 130. The lateral protrusion 136 may be configured to bridge an undercut of the artificial gingiva parts to be casted. However, in contrast to the lateral protrusion 136 shown in FIG. 20, the lateral protrusion 136 of FIG. 21 extends only below the recess 117, while the lateral protrusion 136 of FIG. 20 also extends below 3D digital matrix model 100. Thus, the 3D digital matrix model 100 of FIG. 20 is arranged on the lateral protrusion 136, while the 3D digital matrix model 100 of FIG. 21 also extends laterally to the lateral protrusion 136 of the 3D digital tissue model 130.

Figure 22:
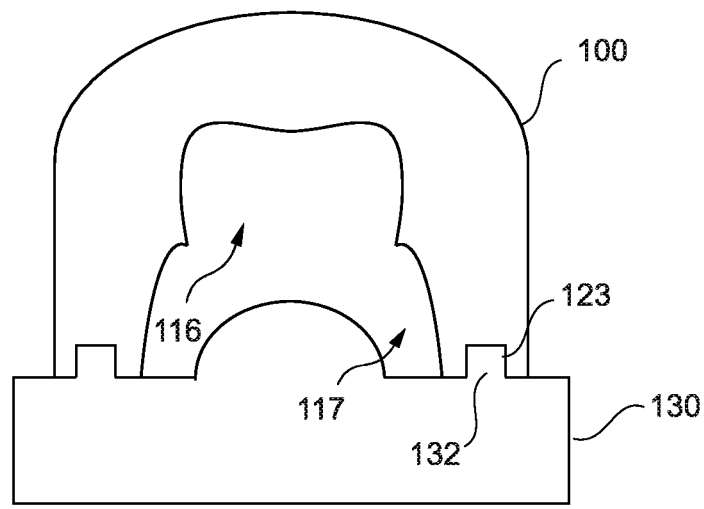
FIG. 22 shows a cross-sectional view of a sectional plane through a 3D digital matrix model and a 3D digital tissue model.

FIG. 22 shows a cross-sectional view of a 3D digital matrix model 100 and a 3D digital tissue model 130. The 3D digital matrix model 100 comprises a connection section comprising a non-anatomical connection element 123, e.g., in form of a reception, configured for establishing a non-destructive detachable connection with a connection section comprising a non-anatomical connection element 132, e.g., in form of a protrusion, added to the 3D digital tissue model 130. The reception provided by the connection element 123 may be configured to receive the protrusion provided by the connection element 132. Using the non-anatomical connection elements 123, 132 of the 3D digital matrix model 100 and the 3D digital tissue model 130, the casting matrix defined by the 3D digital matrix model and the tissue model defined by the 3D digital tissue model may be effectively connectable in order to provide a stable non-destructive detachable connection between the both during the casting of the artificial gingiva parts of the removal denture.

The non-anatomical connection elements 123, 132 may in addition be used as positioning elements for arranging the casting matrix defined by the 3D digital matrix model 100 at a predefined position on the 3D digital tissue model 130.

Figure 23:
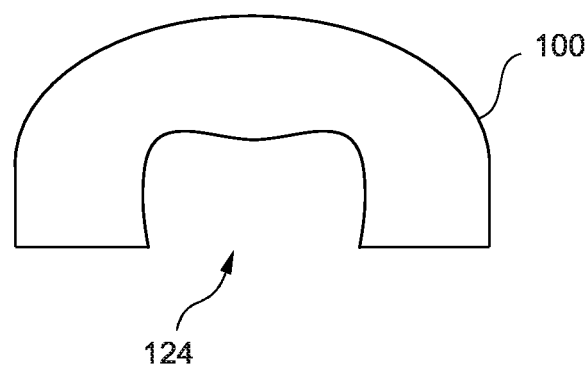
FIG. 23 shows a cross-sectional view of a sectional plane through a 3D digital matrix model.

FIG. 23 shows a cross-sectional view of a 3D digital matrix model 100 through a reception of the 3D digital matrix model 100 configured for receiving a natural tooth of the patient, in order to retain the casting matrix a defined by the 3D digital matrix model 100 at a tissue model resembling the natural tissue of the patient or at the natural tissue in the oral cavity of the patient at a predefined position.

Figure 24:
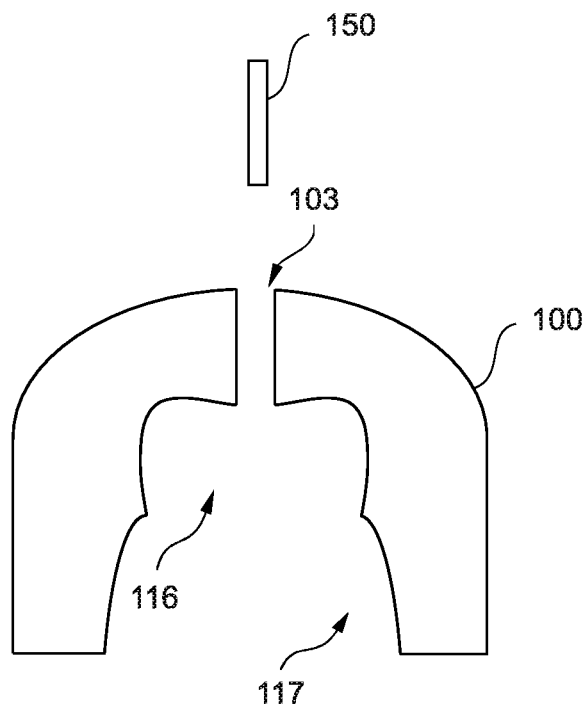
FIG. 24 shows a cross-sectional view of a sectional plane through a 3D digital shell model with a through-hole.

FIG. 24 shows a cross-sectional view of a sectional plane through a 3D digital matrix model 100 with a through-hole 103. The through-hole 103 extends from a reception 116 a recess 117 of the 3D digital matrix model 100 through the 3D digital matrix model 100. The through-hole is configured for inserting an attachment element 150 for attaching an artificial tooth arranged within the reception 116 to the casting matrix defined by the 3D digital casting model 100.

Thus, an effective attaching of artificial teeth arranged within casting matrix at a predefined position may be ensured. The attachment implemented using the attachment element 150 may prevent any dislocating of the artificial teeth during the arranging of the casting matrix on the tissue model or the natural tissue. Furthermore, the attachment may prevent any dislocating of the artificial teeth during the casting of the one or more artificial gingiva parts.

Figure 25:
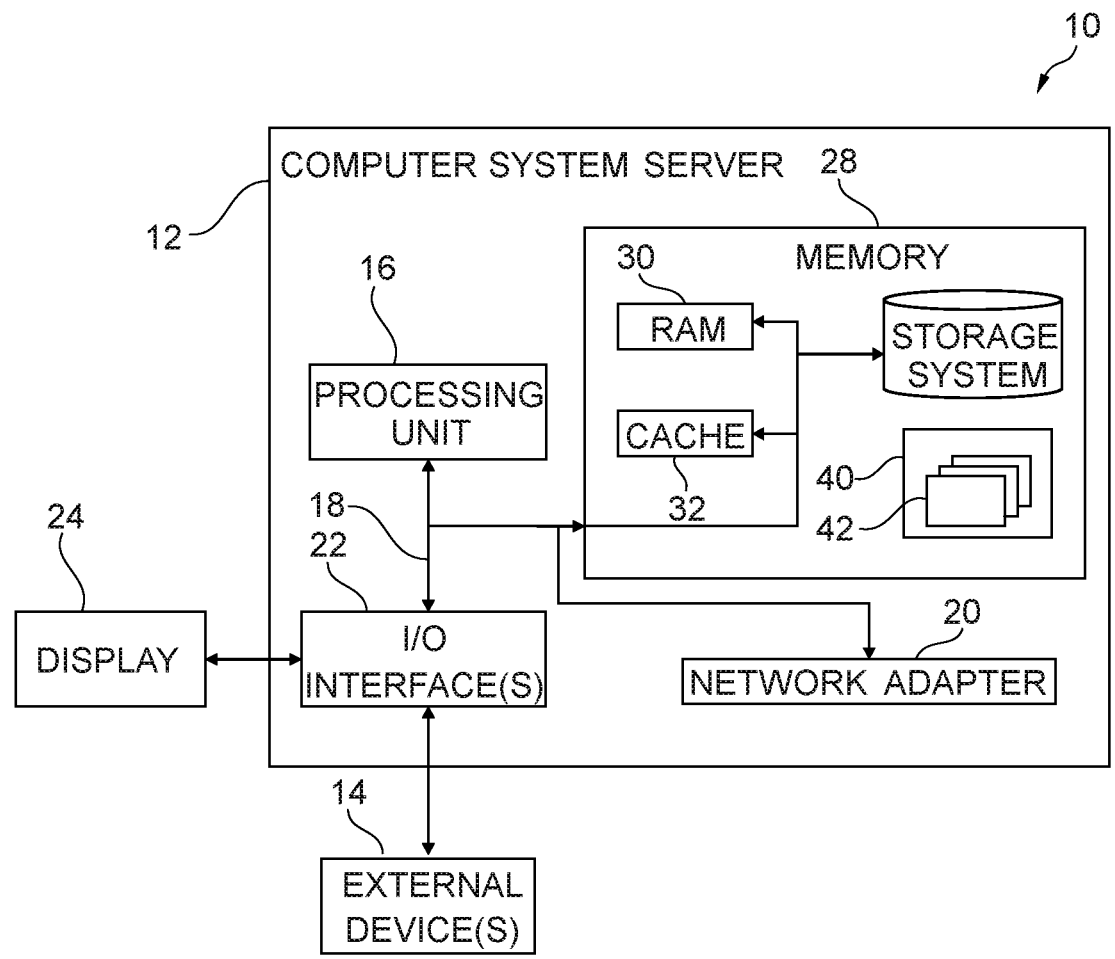
FIG. 25 shows an exemplary computer device for providing a template for a casting matrix.

FIG. 25 shows a schematic diagram of an exemplary computer device 10 for providing a template for a casting matrix configured for casting one or more artificial gingiva parts of a removable denture. The computer device 10 may be operational with numerous other general-purpose or special-purpose computing system environments or configurations. Computer device 10 may be described in the general context of computer device executable instructions, such as program modules comprising executable program instructions, being executable by the computer device 10. Generally, program modules may include routines, programs, objects, components, logic, data structures, and so on that perform particular tasks or implement particular abstract data types. Computer device 10 may be practiced in distributed computing environments where tasks are performed by remote processing devices that are linked through a communications network. In a distributed computing environment, program modules may be located in both local and remote computer device storage media including memory storage devices.

In FIG. 25, computer device 10 is shown in the form of a general-purpose computing device. The components of computer device 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 10 may comprise a variety of computer device readable storage media. Such media may be any available storage media accessible by computer device 10, and include both volatile and non-volatile storage media, removable and non-removable storage media.

A system memory 28 may include computer device readable storage media in the form of volatile memory, such as random-access memory (RAM) 30 and/or cache memory 32. Computer device 10 may further include other removable/non-removable, volatile/non-volatile computer device storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may include at least one program product having a set of program modules, e.g., at least one program module, configured to provide the template for the casting matrix configured for casting one or more artificial gingiva parts of the removable denture. Memory 28 may, e.g., further comprise a tooth library providing a plurality of predefined sets of artificial teeth, a gingiva library providing a plurality of predefined artificial gingivas or gingiva parts and/or a set of predefined elements of supporting frameworks. For example, from the tooth library artificial teeth, from the gingiva library artificial gingiva parts and/or from the set of predefined elements of supporting frameworks elements to be used to generate a supporting frame may be selected for providing the 3D digital denture model.

Program 40 may have a set of one or more program modules 42 and by way of example be stored in memory 28. The program modules 42 may comprise an operating system, one or more application programs, other program modules, and/or program data. Each of the operating system, one or more application programs, other program modules, and program data or some combination thereof, may include an implementation of a networking environment. One or more of the program modules 42 may enable a providing of the template for the casting matrix configured for casting one or more artificial gingiva parts of the removable denture.

Computer device 10 may further communicate with one or more external devices 14 such as a keyboard, a pointing device, like a mouse, and a display 24 enabling a user to interact with computer device 10. Such communication can occur via input/output (I/O) interfaces 22. Computer device 10 may further communicate with one or more networks such as a local area network (LAN), a general wide area network (WAN), and/or a public network, like the Internet, via network adapter 20. Network adapter 20 may communicate with other components of computer device 10 via bus 18. It should be understood that although not shown, other hardware and/or software components could be used in conjunction with computer device 10.

The computer device 10 shown in FIG. 25 may be configured for providing of the template for the casting matrix configured for casting one or more artificial gingiva parts of the removable denture. The computer device 10 may be a standalone computer with no network connectivity that may receive data to be processed through a local interface. The data received by computer device 10 may for example comprise scan data of a patient's mouth from an intraoral scan or from a scan of a classical mold/impression, e.g., providing information about the surface structure of the patient's intraoral tissue on which the removal denture is to be arranged. This data may be used to provide a 3D tissue model used to generate a 3D digital denture model. The 3D digital tissue model and the 3D digital denture model may be used to generate a 3D digital matrix model of a casting matrix configured to cast the artificial gingiva parts of the removable denture. Alternatively, the data received may, e.g., comprise the 3D digital tissue model and/or the 3D digital denture model. The computer device 10 may be used to provide the template for the casting matrix configured for casting one or more artificial gingiva parts of the removable denture. Such operation may, however, likewise be performed using a computer device that is connected to a network such as a communications network and/or a computing network.

Figure 26:
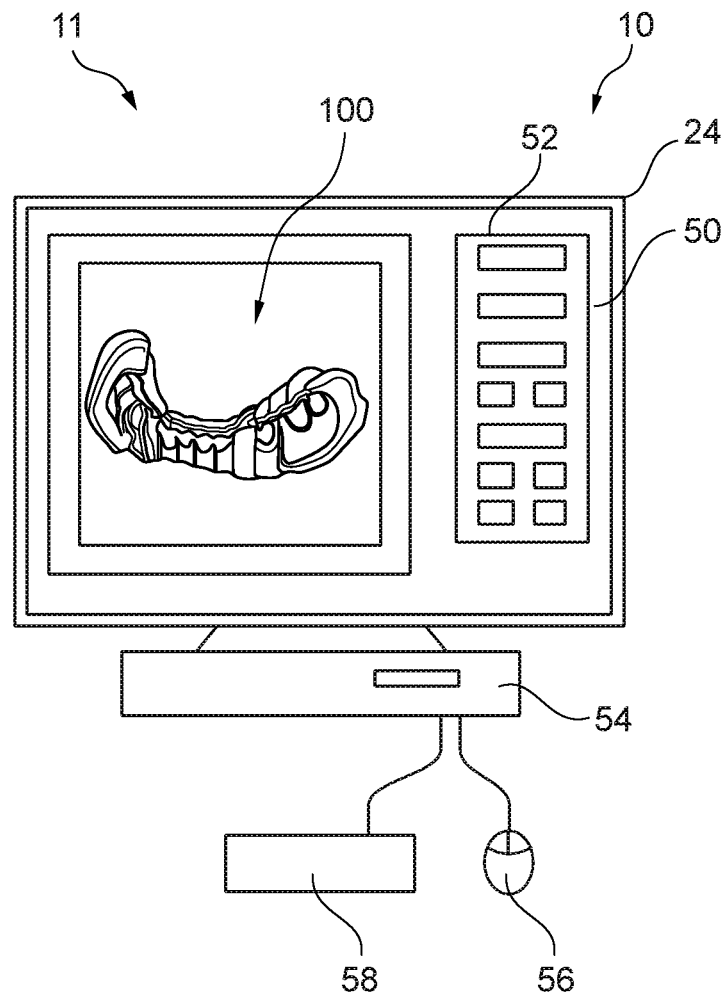
FIG. 26 shows an exemplary computer device for providing a template for a casting matrix.

FIG. 26 shows an exemplary system 11 comprising a computer device 10 for providing a template for a casting matrix configured for casting one or more artificial gingiva parts of a removable denture. The computer device 10 may, e.g., be configured as shown in FIG. 25. The computer device 10 may comprise a hardware component 54 comprising one or more processors as well as a memory storing machine-executable program instructions. Execution of the program instructions by the one or more processors may cause the one or more processors to control the computer device 10 to provide the template for the casting matrix configured for casting one or more artificial gingiva parts of the removable denture.

The casting matrix comprises one or more recesses. Each of the recesses has a 3D geometric form, which is a negative of a 3D geometric form of a section of the removable denture with one of the artificial gingiva parts to be casted. For example, each of the recesses comprises one or more receptions for receiving one or more artificial teeth of the removable denture. The providing may require providing a 3D digital tissue model of tissue of an oral cavity of a patient on which the removable denture is to be arranged, providing a 3D digital denture model of the removable denture using the 3D digital tissue model with the removable denture comprising one or more artificial teeth arranged within the one or more artificial gingiva parts arranged on the 3D digital tissue model and generating using the 3D digital tissue model and the 3D digital denture model a 3D digital matrix model of the casting matrix. The 3D digital matrix model envelopes the one or more sections of the 3D digital denture model with the one or more artificial gingiva parts arranged on the 3D digital tissue model.

The computer device 10 may further comprise one or more input devices, like a keyboard 54 and a mouse 56, enabling a user to interact with the computer device 10. Furthermore, the computer device 10 may comprise one or more output devices, like a display 24 providing a graphical user interface 50 with control elements 52, e.g., GUI elements, enabling the user to control the providing of the template in form of a 3D digital matrix model 100 for the casting matrix configured for casting one or more artificial gingiva parts of the removable denture. Furthermore, the control elements 52 may, e.g., be used to generate, adjust and/or modify a 3D digital denture model, 3D digital tissue model and/or 3D digital shell model.

Figure 27:
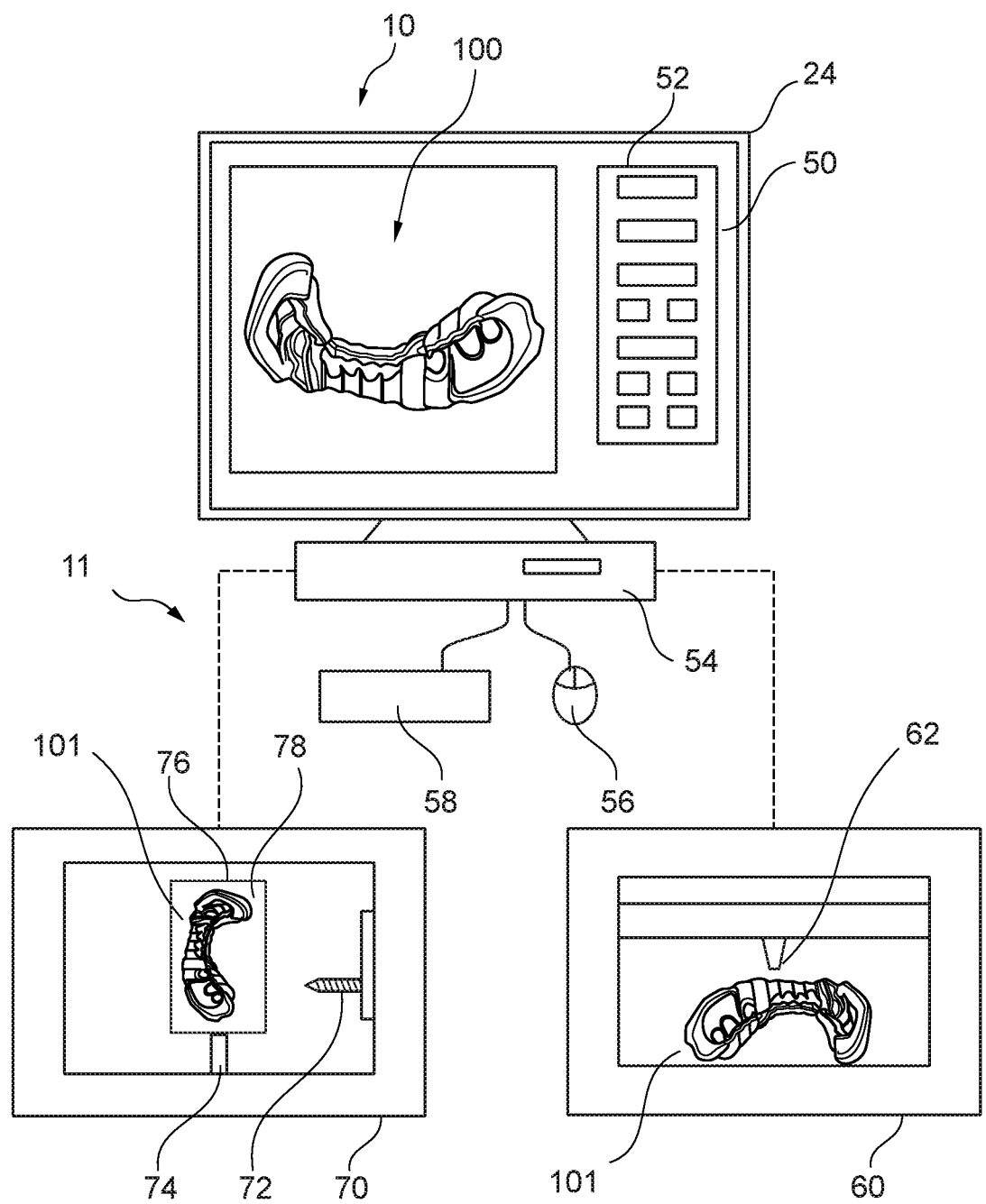
FIG. 27 shows an exemplary system for manufacturing a casting matrix.

FIG. 27 shows an exemplary system 11 for manufacturing a physical casting matrix using the 3D digital matrix model 100 as a template. The physical casting matrix is a physical copy of the respective template. It may be configured to be used for casting one or more artificial gingiva parts of a removable denture. Furthermore, the system 11 may be configured for manufacturing a physical tissue model of the natural tissue of a patient using a 3D digital tissue model as template. The manufactured tissue model is a physical copy of the respective template. Furthermore, the system 11 may be configured for manufacturing one or more teeth of the removable denture using 3D digital tooth models as templates. The manufactured teeth being physical copies of the respective templates. Furthermore, the system 11 may be configured for manufacturing a supporting framework of the removable denture using a 3D digital framework model as template. The manufactured supporting framework being a physical copy of the respective template. Furthermore, the system 11 may be configured for manufacturing a mantle shell using a 3D digital shell model as template. The manufactured mantle shell being a physical copy of the respective template. Furthermore, the system 11 may be configured for manufacturing one or more additional non-casted gingiva parts using a 3D digital denture model as template. The manufactured additional non-casted gingiva parts being physical copies of the respective templates. For example, the additional non-casted gingiva parts may be upper gingiva parts extending over the supporting framework of the removable denture. The upper gingiva parts may comprise receptions, e.g., in form of blind hole or a through-hole. This additional non-casted gingiva parts may be manufactured before casting the other gingiva parts. For example, the additional gingiva parts are manufactured using machining or 3D printing. The casted gingiva parts may, e.g., complete the additional non-casted gingiva parts by extending below the supporting framework such that the resulting artificial gingiva envelopes at least a part of the supporting framework without hollow sections below the supporting framework.

The system 11 may comprise the computer device 10 of FIG. 26. The computer device 10 may further be configured to control one or more manufacturing devices 60, 70. For example, the system 11 may comprise a manufacturing device in form of a machining device 70 controlled by the computer device 10. The machining device 70 may be configured to machining a blank 76 using one or more machining tools 72. The blank 76 of raw material 78 may be provided using a holding device 74 and cut into a desired final shape and size of the dental element to be manufactured, e.g., a physical casting matrix 101 as defined by the 3D digital matrix model 100, using the one or more machining tools 72 for executing a controlled material-removal process. The machining tool 72 may, e.g., be a milling tool. A 3D digital model, e.g., the 3D digital matrix mode 100, may provide a template for the element being manufactured using the machining device 70, e.g., the physical casting matrix 101.

For example, the machining device 70 may further be used to manufacture one or more of the following: a physical tissue model of the natural tissue of a patient using, e.g., a 3D digital tissue model as template, one or more teeth of the removable denture using 3D digital tooth models, e.g., provided by a 3D digital denture model, as templates, a supporting framework of the removable denture using, e.g., the 3D digital framework model as template, a mantle shell using, e.g., a 3D digital shell model as template, one or more additional non-casted gingiva parts using, e.g., the 3D digital denture model as templates.

For example, the system 11 may comprise a manufacturing device in form of a 3D printing device 60. The 3D printing device 60 may be controlled by the computer device 10 and configured to print one or more dental element to be manufactured, e.g., an artificial gingiva 112 defining an adjusted position of a dental arch. The 3D printing device 60 may comprise a printing element 62 configured to print the respective element, like the casting matrix 101, layer by layer. The printing element 62 may, e.g., comprise a nozzle configured for distributing printing material. A 3D digital model, e.g., a 3D digital matrix model 100, may provide a template of the physical element manufactured using the 3D printing device 60, e.g., of the casting matrix 101.

For example, the 3D printing device 60 may further be used to manufacture one or more of the following: a physical tissue model of the natural tissue of a patient using, e.g., a 3D digital tissue model as template, one or more teeth of the removable denture using 3D digital tooth models, e.g., provided by a 3D digital denture model, as templates, a supporting framework of the removable denture using, e.g., the 3D digital framework model as template, a mantle shell using, e.g., a 3D digital shell model as template, one or more additional non-casted gingiva parts using, e.g., the 3D digital denture model as templates.

For manufacturing a metal element, e.g., a metal supporting framework, the 3D printing device 60 be configured for executing selective laser sintering or melting. Selective laser sintering uses a laser for sintering a powdered material, aiming the laser automatically at points in space defined by a 3D digital model of the element to be printed. The laser energy may result in a local sintering or melting of the powdered material, binding the material together to create a solid structure. For example, the printing element 62 may comprise a laser and/or a distributing device for distributing the powdered material.

Figure 28:
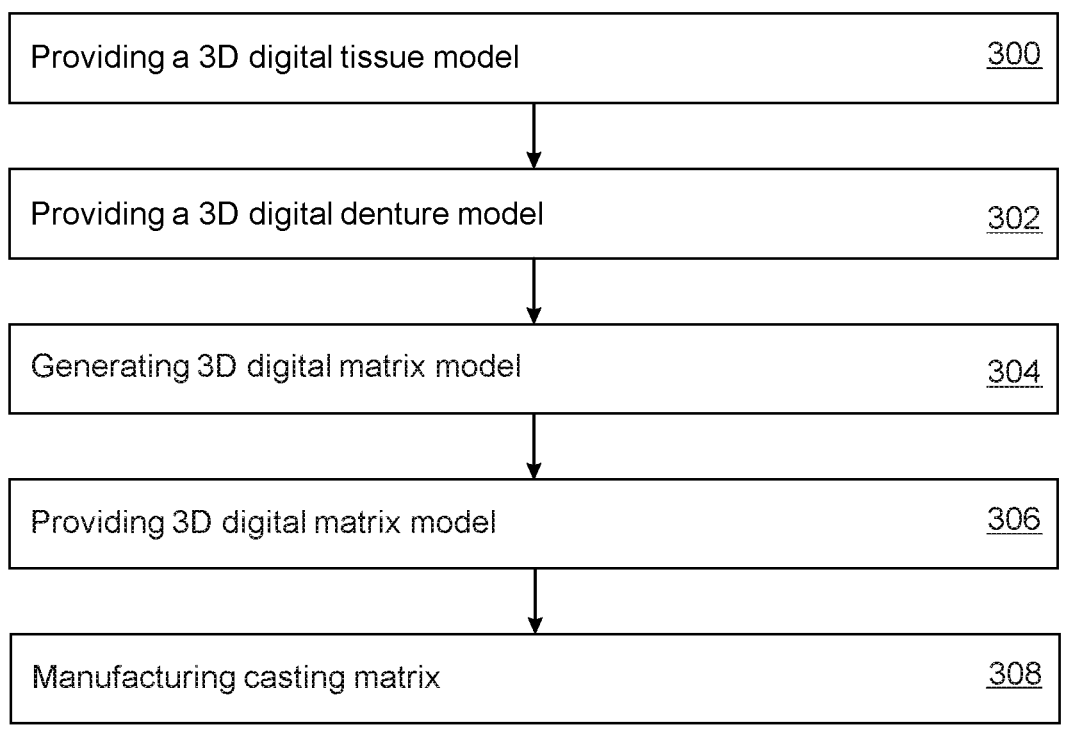
FIG. 28 shows a flowchart illustrating an exemplary method for providing a template for a casting matrix.

FIG. 28 shows an exemplary method for providing a template for a casting matrix. The template is provided in form of a 3D digital casting matrix. In block 300, a 3D digital tissue model of tissue of an oral cavity of a patient is provided on which the removable denture is to be arranged. The 3D digital tissue model may be received via a network, read from a storage medium or generated using scan data of the tissue. The scan data may, e.g., be scan data acquired using an optical scanner. The scan data may be scan data resulting from an intraoral scan, from a scan of an impression of the natural tissue or from a scan from of a physical tissue model generated using the impression of the natural tissue.

In block 302, a 3D digital denture model of the removable denture is provided using the 3D digital tissue model. The 3D digital denture model may, e.g., be generated on the 3D digital tissue model and adjusted to the individual anatomical features of the patient. The removable denture defined by the 3D digital denture model comprises one or more artificial teeth arranged within one or more artificial gingiva parts arranged on the 3D digital tissue model. In addition, the 3D digital denture model may, e.g., comprise a supporting framework. The supporting framework may be configured for supporting the artificial teeth of the removable denture and stabilizing the removable denture.

In block 304, the 3D digital tissue model provided in block 300 and the 3D digital denture model provided in block 302 are used for generating a 3D digital matrix model of the casting matrix. The casting matrix comprises one or more recesses. Each of the recesses has a 3D geometric form, which is a negative of a 3D geometric form of a section of the removable denture with one of the artificial gingiva parts to be casted. For example, each of the recesses comprises one or more receptions for receiving one or more artificial teeth of the removable denture. The 3D digital matrix model envelops the sections of the 3D digital denture model with artificial gingiva parts and the artificial teeth arranged on the 3D digital tissue model. In block 306, the 3D digital matrix model is provided as template for manufacturing the casting matrix. In block 308, the casting matrix is manufactured using the 3D digital matrix model as the template. The manufactured casting matrix is a physical copy of the respective template. The casting matrix may, e.g., be manufactured using machining or 3D printing.

Figure 29:
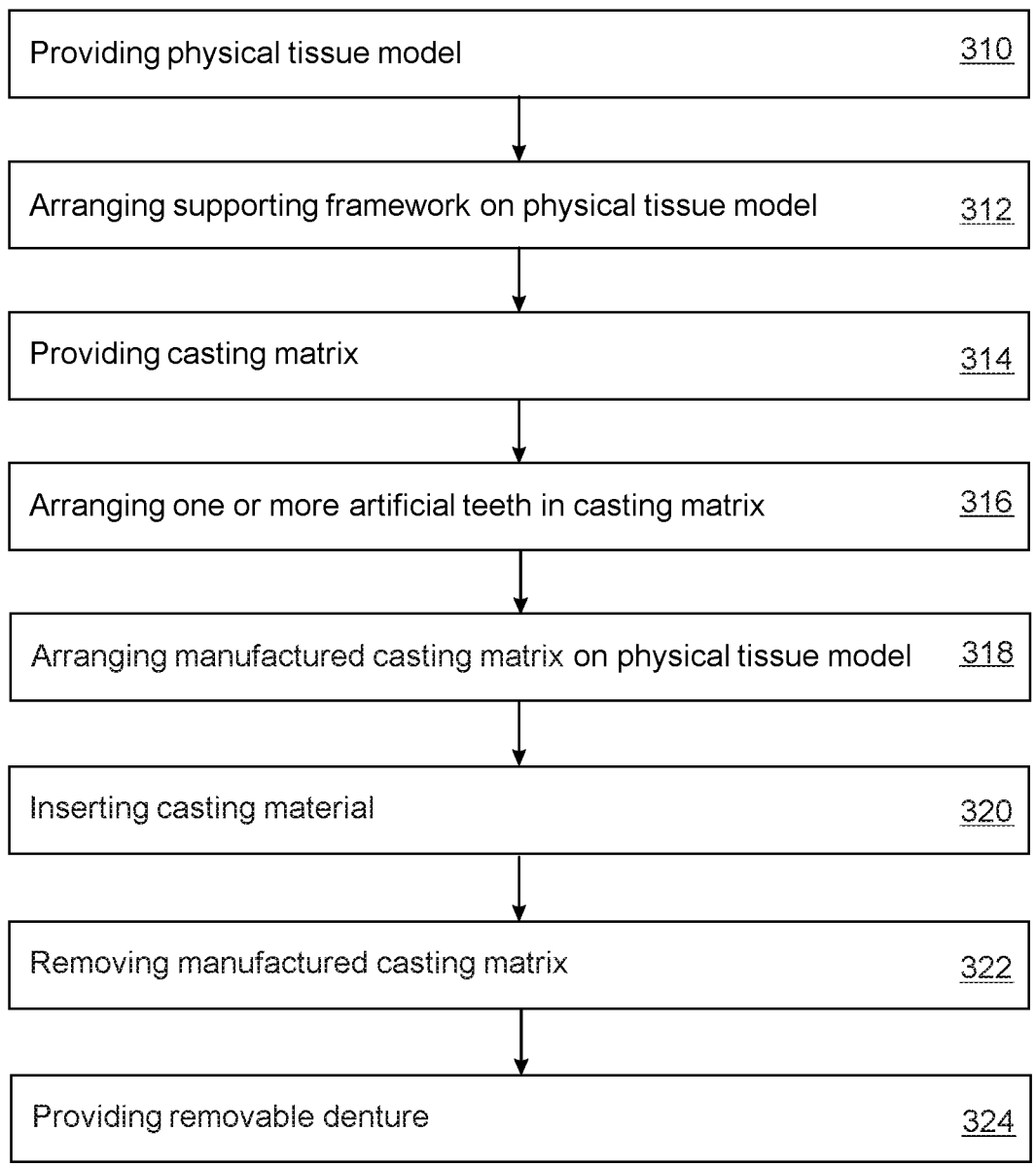
FIG. 29 shows a flowchart illustrating an exemplary method for manufacturing a removable denture using a casting matrix.

FIG. 29 shows an exemplary method for manufacturing a removable denture using a casting matrix and a tissue model. In block 310, the physical tissue model is provided resembling the natural intraoral tissue of the patient is provided, on which the removable denture is to be arranged. For example, the physical tissue model may be manufactured using a 3D digital matrix model. In block 312, a supporting framework may be arranged on the physical tissue model. For example, the supporting framework may be manufactured using a 3D digital denture model. In block 314, a casting matrix is provided. The casting matrix may, e.g., be manufactured as described in FIG. 28. In block 316, the one or more artificial teeth of the removable denture are arranged in one or more receptions of the casting matrix. For example, the artificial teeth may be manufactured using the 3D digital denture model. For example, additional pre-manufactured artificial gingiva parts may additionally be arranged in the casting matrix or on the supporting framework. The pre-manufactured artificial gingiva parts may be upper gingiva parts extending over the supporting framework. In block 318, the casting matrix with the artificial teeth is arranged on the physical tissue model. On the physical tissue model, the supporting framework may, e.g., be arranged as described in block 312. Alternatively, the supporting framework may be arranged within the casting matrix, after the artificial teeth have been arranged therein. In this case, the casting matrix with the artificial teeth and the supporting framework is arranged on the physical tissue model. The casting matrix may, e.g., be arranged on the tissue model in such a way that the walls of the casting matrix enclosing the recesses each come into contact with the tissue model in a sealing manner.

In block 320, casting material for casting the artificial gingiva parts of the removable denture is inserted into the casting matrix arranged on the physical tissue model, i.e., into the remaining free space of the recesses of the manufactured casting matrix. In block 322, the manufactured casting matrix is removed from the physical tissue model, after the inserted casting material is cured. In block 324, the removable denture is removed from the tissue model and provided comprising the artificial gingiva parts casted using the casting material.

Figure 30:
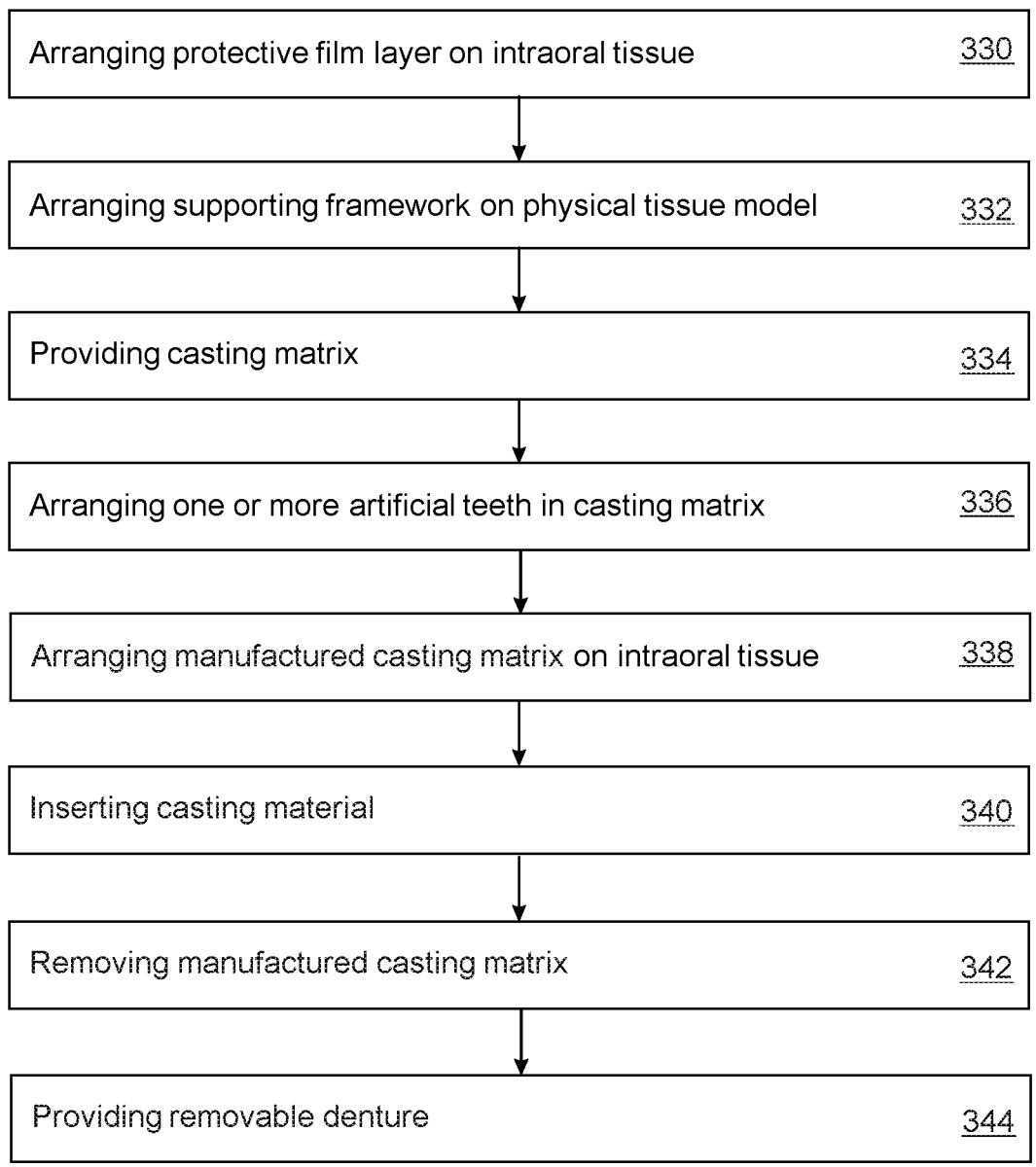
FIG. 30 shows a flowchart illustrating an exemplary method for manufacturing a removable denture using a casting matrix.

FIG. 30 shows an exemplary method for manufacturing a removable denture on intraoral tissue of a patient. In block 330, a protective film layer is arranged on the intraoral tissue. In block 332, a supporting framework may be arranged on the intraoral tissue. For example, the supporting framework may be manufactured using a 3D digital denture model. In block 334, a casting matrix is provided. The casting matrix may, e.g., be manufactured as described in FIG. 28. In block 336, the one or more artificial teeth of the removable denture are arranged in one or more receptions of the casting matrix. For example, the artificial teeth may be manufactured using the 3D digital denture model. For example, additional pre-manufactured artificial gingiva parts may additionally be arranged in the casting matrix or on the supporting framework. The pre-manufactured artificial gingiva parts may be upper gingiva parts extending over the supporting framework. In block 338, the casting matrix with the artificial teeth is arranged on the intraoral tissue. On the intraoral tissue, the supporting framework may, e.g., be arranged as described in block 332. Alternatively, the supporting framework may be arranged within the casting matrix, after the artificial teeth have been arranged therein. In this case, the casting matrix with the artificial teeth and the supporting framework is arranged on the intraoral tissue. The casting matrix may, e.g., be arranged on the tissue model in such a way that the walls of the casting matrix enclosing the recesses each come into contact with the protective film layer arranged on the intraoral tissue in a sealing manner.

In block 340, casting material for casting the artificial gingiva parts of the removable denture is inserted into the casting matrix arranged on the intraoral tissue, i.e., into the remaining free space of the recesses of the manufactured casting matrix. In block 342, the manufactured casting matrix is removed from the intraoral tissue, after the inserted casting material is cured. In block 344, the removable denture is removed from the intraoral tissue and provided comprising the artificial gingiva parts casted using the casting material.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. A further example of an optical disk may be a Blu-ray disk. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave.

Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. In some embodiments, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer device or distributed amongst multiple computer devices. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

A "user interface" as used herein is an interface which allows a user or operator to interact with a computer or computer device. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from an operator.

A GUI element is a data object some of which's attributes specify the shape, layout and/or behavior of an area displayed on a graphical user interface, e.g., a screen. A GUI element can be a standard GUI element such as a button, a text box, a tab, an icon, a text field, a pane, a check-box item or item group or the like. A GUI element can likewise be an image, an alphanumeric character or any combination thereof. At least some of the properties of the displayed GUI elements depend on the data value aggregated on the group of data object said GUI element represents.

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Possible advantageous embodiments may comprise the following combinations of features:

1. A computer-implemented method for providing a template for a casting matrix configured for casting one or more artificial gingiva parts of a removable denture, the casting matrix comprising one or more recesses, each of the recesses having a 3D geometric form, which is a negative of a 3D geometric form of a section of the removable denture with one of the artificial gingiva parts to be casted, the method comprising:
    providing a 3D digital tissue model of tissue of an oral cavity of a patient on which the removable denture is to be arranged,
    providing a 3D digital denture model of the removable denture using the 3D digital tissue model, the removable denture comprising one or more artificial teeth arranged within the one or more artificial gingiva parts arranged on the 3D digital tissue model,
    generating using the 3D digital tissue model and the 3D digital denture model a 3D digital matrix model of the casting matrix, the 3D digital matrix model enveloping the one or more sections of the 3D digital denture model with the one or more artificial gingiva parts arranged on the 3D digital tissue model,
    providing the 3D digital matrix model as the template for manufacturing the casting matrix.

2. The method of feature combination 1, further comprising manufacturing the casting matrix using the 3D digital matrix model as the template, the manufactured casting matrix being a physical copy of the respective template.

3. The method of feature combination 2, the casting matrix being manufactured using one of the following: machining, 3D printing, casting.

4. The method of any of the preceding feature combinations, further comprising:
    providing the 3D digital tissue model as template for manufacturing a physical tissue model of the tissue of the oral cavity of the patient on which the removable denture is to be arranged, the casting matrix being configured for being arranged on the tissue model,
    manufacturing the tissue model using the 3D digital tissue model as template, the manufactured tissue model being a physical copy of the respective template.

5. The method of feature combination 4, the tissue model being manufactured using one of the following: machining, 3D printing, casting.

6. The method of any of the preceding feature combinations, further comprising:
    providing one or more 3D digital tooth models of one or more teeth comprised by the 3D digital denture model as templates for manufacturing the one or more teeth of the removable denture,
    manufacturing the one or more teeth of the removable denture using the 3D digital tooth models as templates, the manufactured teeth being physical copies of the respective templates.

7. The method of feature combination 6, the one or more teeth being manufactured using one of the following: machining, 3D printing, casting.

8. The method of any of the preceding feature combinations, the 3D digital denture model further comprising a 3D digital framework model of a supporting framework of the removable denture, the supporting framework being configured for supporting the one or more teeth of the removable denture and stabilizing the removable denture.

9. The method of feature combination 8, the supporting framework further being configured to fix the removable denture to one or more teeth of the tissue model.

10. The method of any of the feature combinations 8 to 9, further comprising:
    providing the 3D digital framework model as template for manufacturing the supporting framework,
    manufacturing the supporting framework using the 3D digital framework model as template, the manufactured supporting framework being a physical copy of the respective template.

11. The method of feature combination 10, the supporting framework being manufactured using one of the following: machining, 3D printing, casting.

12. The method of any of the feature combinations 2 to 11, further comprising manufacturing the removable denture, the manufacturing of the removable denture comprising:
    arranging the one or more artificial teeth of the removable denture in one or more receptions of the one or more recesses of the manufactured casting matrix, each of the receptions being configured for receiving one of the artificial teeth of the removable denture,
    arranging the manufactured casting matrix with the one or more artificial teeth of the removable denture on the physical tissue model,
    inserting casting material for casting the one or more artificial gingiva parts of the removable denture into the remaining free space of the one or more recesses of the manufactured casting matrix arranged on the physical tissue model,
    removing the manufactured casting matrix from the physical tissue model, after the inserted casting material is cured,
    providing the removable denture comprising the one or more artificial gingiva parts casted using the casting material.

13. The method of feature combination 12, the manufacturing of the removable denture further comprising arranging the supporting framework on the physical tissue model, such that at least one or more sections of the supporting framework are arranged within the one or more recesses of the casting matrix arranged on the physical tissue model.

14. The method of any of the feature combinations 12 to 13, further comprising manufacturing one or more additional gingiva parts of the removable denture to be complemented by the one or more gingiva parts being casted, the one or more additional gingiva parts being arranged together with the artificial teeth in the one or more recesses of the manufactured casting matrix.

15. The method of feature combination 14, the one or more additional gingiva parts being manufactured using one of the following: machining, 3D printing.

16. The method of any of the feature combination 14 to 15, the one or more additional gingiva parts being upper gingiva parts extending over the supporting framework of the removable denture, the one or more gingiva parts being casted being lower gingiva parts extending underneath the supporting framework.

17. The method of any of the preceding feature combinations, the 3D digital matrix model being configured to build a sealed contact between boundaries of the one or more recesses of the 3D digital matrix model arranged on the 3D digital tissue model and the 3D digital tissue model, the sealed contact preventing casting material from escaping from the one or more recesses.

18. The method of any of the feature combinations 1 to 16, the 3D digital matrix model comprising one or more openings between boundaries of the one or more recesses of the 3D digital matrix model arranged on the 3D digital tissue model and the 3D digital tissue model, the openings being configured for inserting casting material into the one or more recesses.

19. The method of feature combination 18, the one or more openings being arranged on at least one of the following sides of the one or more recesses: on an oral side, on a vestibular side.

20. The method of any of the preceding feature combinations, the 3D digital matrix model comprising one or more injection channels configured for inserting the casting material by injecting the casting material into the one or more recesses of the 3D digital matrix model.

21. The method of any of the preceding feature combinations, the 3D digital matrix model comprising one or more venting channels configured for letting out air form the one or more recesses, when the casting material is inserted into the one or more recesses of the 3D digital matrix model.

22. The method of any of the preceding feature combinations, the 3D digital matrix model comprising one or more positioning elements for arranging and fixating the casting matrix at a predefined position on the 3D digital tissue model.

23. The method of feature combination 22, the positioning elements comprising one or more tooth fixating elements for fixating the casting matrix at one or more teeth of the 3D digital tissue model.

24. The method of feature combination 23, the tooth fixating elements comprising one or more receptions for receiving one or more teeth of the 3D digital tissue model.

25. The method of any of the feature combinations 22 to 24, the positioning elements comprising one or more first connection sections configured for establishing a non-destructive detachable connection with one or more second connection sections added to the 3D digital tissue model, each of the first connection sections comprising one or more non-anatomical first connection elements, each of the second connection sections comprising one or more non-anatomical second connection elements.

26. The method of feature combination 25, the one or more non-anatomical first connection elements comprising one or more first protrusions configured to be inserted into one or more second receptions comprised by the one or more non-anatomical second connection elements.

27. The method of any of the feature combinations 25 to 26, the one or more non-anatomical first connection elements comprising one or more first receptions configured to receive one or more second protrusions comprised by the one or more non-anatomical second connection elements.

28. The method of any of the preceding feature combinations, the 3D digital tissue model being provided with one or more non-anatomical lateral protrusions, the one or more non-anatomical lateral protrusions being configured to bridge one or more undercuts of the one or more artificial gingiva parts of the 3D digital denture model arranged on the 3D digital tissue model.

29. The method of any of the preceding feature combinations, the 3D digital matrix model being provided in a two-part form comprising a vestibular part and an oral part, the labial and oral parts being configured to establish a non-destructive detachable connection each other.

30. The method of feature combination 29, the vestibular part comprising one or more third connection elements for establishing the detachable connection, the oral part comprising one or more fourth connection elements configured for establishing the detachable connection.

31. The method of feature combination 30, the one or more third connection elements comprising one or more third protrusions configured to be inserted into one or more fourth receptions comprised by the one or more fourth connection elements.

32. The method of any of the feature combinations 30 to 31, the one or more third connection elements comprising one or more third receptions configured to receive one or more fourth protrusions comprised by the one or more fourth connection elements.

33. The method of any of the feature combinations 29 to 32, the 3D digital matrix model comprising one or more additional clamping elements, the clamping elements being configured to span round the vestibular part and the oral part exerting a clamping force pressing the vestibular part and the oral part against each other.

34. The method of any of the feature combinations 29 to 32, the vestibular part of the casting matrix being manufactured using a first material, the oral part of the casting matrix being manufactured using a second material, one of the two materials being more rigid than the other one.

35. The method of any of the preceding feature combinations, further comprising:
generating at least one 3D digital shell model of a mantle shell for the casting matrix, the 3D digital shell being a negative of an outer 3D geometrical form of the 3D digital matrix model, the mantle shell being configured to be slipped over the casting matrix providing structural support to the casting matrix,
providing the 3D digital shell model as a template for manufacturing the mantle shell.

36. The method of feature combination 35, the 3D digital shell model of the mantle shell providing a reception for receiving the casting matrix, the reception of the mantle shell comprising straight internal side-faces, the casting matrix comprising straight external side-faces in contact with the straight internal side-faces of the mantle shell, when the mantle shell is slipped over the casting matrix.

37. The method of any of feature combinations 35 to 36, the reception of the 3D digital shell model of the mantle shell comprising a U-shaped cross section, the outer 3D geometrical form of the 3D digital matrix model comprising a matching U-shaped cross section.

38. The method of any of feature combinations 35 to 37, the 3D digital shell model comprising one or more injection channels configured for inserting the casting material by injecting the casting material into the one or more recesses of the 3D digital matrix model, over which the 3D digital shell model is slipped.

39. The method of any of feature combinations 35 to 38, the 3D digital shell model comprising one or more venting channels configured for letting out air form the one or more recesses, when the casting material is inserted into the one or more recesses of the 3D digital matrix model, over which the 3D digital shell mode is slipped.

40. The method of any of feature combinations 35 to 39, further comprising manufacturing the mantle shell using the 3D digital shell model as template, the manufactured mantle shell being a physical copy of the respective template.

41. The method of feature combination 40, the mantle shell being manufactured using one of the following: machining, 3D printing, casting.

42. The method of any of the feature combinations 40 to 41, the mantle shell being manufactured using a material which is more rigid than a material used for manufacturing the casting matrix.

43. The method of any of the preceding feature combinations, the one or more receptions of the one or more recesses of the 3D digital casting model for receiving the one or more artificial teeth of the removable denture each comprising a through-hole for inserting an attachment element for attaching the artificial teeth to the 3D digital casting model.

44. The method of any of the preceding feature combinations, the removable denture being one of the following: a removable partial denture, a removable full denture.

45. The method of any of the preceding feature combinations, the 3D digital tissue model comprising one of the following: a 3D digital mandibular tissue model of a mandibular jaw, a 3D digital maxillary model of a maxillary jaw.

46. The method of feature combination 45, each of the jaws being one of the following: a partially edentulous jaw comprising one or more teeth, a completely edentulous jaw.

47. A computer program product for providing a template for a casting matrix configured for casting one or more artificial gingiva parts of a removable denture, the casting matrix comprising one or more recesses, each of the recesses having a 3D geometric form, which is a negative of a 3D geometric form of a section of the removable denture with one of the artificial gingiva parts to be casted,
the computer program product comprising a computer readable storage medium having program instructions embodied therewith, the program instructions being executable by a processor of a computer device to cause the computer device to:
provide a 3D digital tissue model of tissue of an oral cavity of a patient on which the removable denture is to be arranged,
provide a 3D digital denture model of the removable denture using the 3D digital tissue model, the removable denture comprising one or more artificial teeth arranged within the one or more artificial gingiva parts arranged on the 3D digital tissue model,
generate using the 3D digital tissue model and the 3D digital denture model a 3D digital matrix model of the casting matrix, the 3D digital matrix model enveloping the one or more sections of the 3D digital denture model with the one or more artificial gingiva parts arranged on the 3D digital tissue model,
provide the 3D digital matrix model as the template for manufacturing the casting matrix.

48. A computer device for providing a template for a casting matrix configured for casting one or more artificial gingiva parts of a removable denture, the casting matrix comprising one or more recesses, each of the recesses having a 3D geometric form, which is a negative of a 3D geometric form of a section of the removable denture with one of the artificial gingiva parts to be casted,
the computer device comprising a processor and a memory storing program instructions executable by the processor, execution of the program instructions by the processor causing the computer device to:
provide a 3D digital tissue model of tissue of an oral cavity of a patient on which the removable denture is to be arranged,
provide a 3D digital denture model of the removable denture using the 3D digital tissue model, the removable denture comprising one or more artificial teeth arranged within the one or more artificial gingiva parts arranged on the 3D digital tissue model,
generate using the 3D digital tissue model and the 3D digital denture model a 3D digital matrix model of the casting matrix, the 3D digital matrix model enveloping the one or more sections of the 3D digital denture model with the one or more artificial gingiva parts arranged on the 3D digital tissue model,
provide the 3D digital matrix model as the template for manufacturing the casting matrix.

49. A manufacturing system comprising the computer device of feature combination 48, the manufacturing system further comprising a manufacturing device configured to manufacture the casting matrix,
execution of the program instructions by the processor further causing the computer device to control the manufacturing device to manufacture the casting matrix using the 3D digital matrix model as the template, the manufactured casting matrix being a physical copy of the respective template.

50. The manufacturing system of feature combination 49, the manufacturing device being one of the following: a machining device, a 3D printing device.

51. A machined or 3D printed casting matrix configured for casting one or more artificial gingiva parts of a removable denture, the casting matrix comprising one or more recesses, each of the recesses having a 3D geometric form, which is a negative of a 3D geometric form of a section of the removable denture with one of the artificial gingiva parts to be casted, the casting matrix being configured for being arranged on at least one of the following: tissue of an oral cavity of a patient on which the removable denture is to be arranged, on a tissue model of the tissue of the oral cavity of the patient on which the removable denture is to be arranged.

LIST OF REFERENCE NUMERALS 10 computer device
11 system
14 external device
16 processing unit
18 bus
20 network adapter
22 I/O interface
24 display
28 memory
30 RAM
32 cache
34 storage system 40 program
42 program module
50 user interface
52 control elements
54 hardware device
56 keyboard
58 mouse
60 3D printing device
62 printing element
70 machining device
72 machining tool
74 holding device
76 blank
78 raw material
100 matrix model
101 casting matrix
102 injection channel
103 through-hole
104 venting channel
106 opening
108 clamping element
110 vestibular part
111 oral part
113 sectional plane
114 connection element
115 connection element
116 tooth reception
117 recess
118 shell model
119 reception
120 injection channel
122 venting channel
123 connection element
124 tooth reception
126 sectional plane
130 tissue model
132 connection element
134 undercut
136 protrusion
140 denture model
141 section
142 artificial gingiva part
143 additional gingiva part
144 artificial teeth
145 hollow section
146 framework model
147 clasp
148 sectional plane
150 attachment element

The invention claimed is:

1. A computer-implemented method for providing a template for a casting matrix configured for casting one or more artificial gingiva parts of a removable denture, the casting matrix comprising one or more recesses, each of the recesses having a 3D geometric form, which is a negative of a 3D geometric form of a respective section of the removable denture with one of the artificial gingiva parts to be casted, the method comprising:
   providing a 3D digital tissue model of tissue of an oral cavity of a patient on which the removable denture is to be arranged,
   providing a 3D digital denture model of the removable denture including each respective section thereof using the 3D digital tissue model, the removable denture comprising one or more artificial teeth arranged within the one or more artificial gingiva parts arranged on the 3D digital tissue model,
   generating using the 3D digital tissue model and the 3D digital denture model a 3D digital matrix model of the casting matrix, the 3D digital matrix model enveloping each respective section of the 3D digital denture model with the one or more artificial gingiva parts arranged on the 3D digital tissue model,
   further comprising manufacturing the casting matrix using the 3D digital matrix model as the template, the manufactured casting matrix being a physical copy of the respective template,
   further comprising manufacturing the removable denture, the manufacturing of the removable denture comprising:
   arranging the one or more artificial teeth of the removable denture in one or more receptions of the one or more recesses of the manufactured casting matrix, each of the receptions being configured for receiving one of the artificial teeth of the removable denture,
   arranging the manufactured casting matrix with the one or more artificial teeth of the removable denture on a physical tissue model, as manufactured using the 3D digital tissue model,
   inserting casting material for casting the one or more artificial gingiva parts of the removable denture into remaining free space of the one or more recesses of the manufactured casting matrix arranged on the physical tissue model,
   removing the manufactured casting matrix from the physical tissue model, after the inserted casting material is cured,
   providing the removable denture comprising the one or more artificial gingiva parts casted using the casting material.

2. The method of claim 1, the casting matrix being manufactured using one of the following: machining, 3D printing, casting.

3. The method of claim 1, further comprising:
   providing the 3D digital tissue model as a template for manufacturing the physical tissue model of the tissue of the oral cavity of the patient on which the removable denture is to be arranged, the casting matrix being configured for being arranged on the tissue model,
   manufacturing the tissue model using the 3D digital tissue model as a template, the manufactured tissue model being a physical copy of the respective template.

4. The method of claim 3, the tissue model being manufactured using one of the following: machining, 3D printing, casting.

5. The method of claim 1, further comprising:
   providing one or more 3D digital tooth models of one or more teeth comprised by the 3D digital denture model as templates for manufacturing the one or more teeth of the removable denture,
   manufacturing the one or more teeth of the removable denture using the 3D digital tooth models as templates, the manufactured teeth being physical copies of the respective templates.

6. The method of claim 5, the one or more teeth being manufactured using one of the following: machining, 3D printing, casting.

7. The method of claim 1, the 3D digital denture model further comprising a 3D digital framework model of a supporting framework of the removable denture, the supporting framework being configured for supporting the one or more teeth of the removable denture and stabilizing the removable denture.

8. The method of claim 7, the supporting framework further being configured to fix the removable denture to one or more teeth of the tissue model.

9. The method of claim 7, further comprising:
providing the 3D digital framework model as a template for manufacturing the supporting framework,
manufacturing the supporting framework using the 3D digital framework model as a template, the manufactured supporting framework being a physical copy of the respective template.

10. The method of claim 9, the supporting framework being manufactured using one of the following: machining, 3D printing, casting.

11. The method of claim 1, the manufacturing of the removable denture further comprising arranging the supporting framework on the physical tissue model, such that at least one or more sections of the supporting framework are arranged within the one or more recesses of the casting matrix arranged on the physical tissue model.

12. The method of claim 1, further comprising manufacturing one or more additional gingiva parts of the removable denture to be complemented by the one or more gingiva parts being casted, the one or more additional gingiva parts being arranged together with the artificial teeth in the one or more recesses of the manufactured casting matrix.

13. The method of claim 12, the one or more additional gingiva parts being manufactured using one of the following: machining, 3D printing.

14. The method of claim 12, the one or more additional gingiva parts being upper gingiva parts extending over the supporting framework of the removable denture, the one or more gingiva parts being casted being lower gingiva parts extending underneath the supporting framework.

15. The method of claim 1, the 3D digital matrix model being configured to build a sealed contact between boundaries of the one or more recesses of the 3D digital matrix model arranged on the 3D digital tissue model and the 3D digital tissue model, the sealed contact preventing casting material from escaping from the one or more recesses.

16. The method of claim 1, the 3D digital matrix model comprising one or more openings between boundaries of the one or more recesses of the 3D digital matrix model arranged on the 3D digital tissue model and the 3D digital tissue model, the openings being configured for inserting casting material into the one or more recesses.

17. The method of claim 16, the one or more openings being arranged on at least one of the following sides of the one or more recesses: on an oral side, on a vestibular side.

18. The method of claim 1, the 3D digital matrix model comprising one or more injection channels configured for inserting the casting material by injecting the casting material into the one or more recesses of the 3D digital matrix model.

19. The method of claim 1, the 3D digital matrix model comprising one or more venting channels configured for letting out air form the one or more recesses, when the casting material is inserted into the one or more recesses of the 3D digital matrix model.

20. The method of claim 1, the 3D digital matrix model comprising one or more positioning elements for arranging and fixating the casting matrix at a predefined position on the 3D digital tissue model.

21. The method of claim 20, the positioning elements comprising one or more tooth fixating elements for fixating the casting matrix at one or more teeth of the 3D digital tissue model.

22. The method of claim 21, the tooth fixating elements comprising one or more receptions for receiving one or more teeth of the 3D digital tissue model.

23. The method of claim 20, the positioning elements comprising one or more first connection sections configured for establishing a non-destructive detachable connection with one or more second connection sections added to the 3D digital tissue model, each of the first connection sections comprising one or more non-anatomical first connection elements, each of the second connection sections comprising one or more non-anatomical second connection elements.

24. The method of claim 23, the one or more non-anatomical first connection elements comprising one or more first protrusions configured to be inserted into one or more second receptions comprised of the one or more non-anatomical second connection elements.

25. The method of claim 23, the one or more non-anatomical first connection elements comprising one or more first receptions configured to receive one or more second protrusions comprised by the one or more non-anatomical second connection elements.

26. The method of claim 1, the 3D digital tissue model being provided with one or more non-anatomical lateral protrusions, the one or more non-anatomical lateral protrusions being configured to bridge one or more undercuts of the one or more artificial gingiva parts of the 3D digital denture model arranged on the 3D digital tissue model.

27. The method of claim 1, the 3D digital matrix model being provided in a two-part form comprising a vestibular part and an oral part, the vestibular and oral parts being configured to establish a non-destructive detachable connection to each other.

28. The method of claim 27, the vestibular part comprising one or more third connection elements for establishing the detachable connection, the oral part comprising one or more fourth connection elements configured for establishing the detachable connection.

29. The method of claim 28, the one or more third connection elements comprising one or more third protrusions configured to be inserted into one or more fourth receptions comprised of the one or more fourth connection elements.

30. The method of claim 28, the one or more third connection elements comprising one or more third receptions configured to receive one or more fourth protrusions comprised of the one or more fourth connection elements.

31. The method of claim 27, the 3D digital matrix model comprising one or more additional clamping elements, the clamping elements being configured to span around the vestibular part and the oral part exerting a clamping force pressing the vestibular part and the oral part against each other.

32. The method of claim 27, the vestibular part of the casting matrix being manufactured using a first material, the oral part of the casting matrix being manufactured using a second material, one of the two materials being more rigid than the other one.

33. The method of claim 1, further comprising:
generating at least one 3D digital shell model of a mantle shell for the casting matrix, the 3D digital shell being a negative of an outer 3D geometrical form of the 3D digital matrix model, the mantle shell being configured to be slipped over the casting matrix providing structural support to the casting matrix,
providing the 3D digital shell model as a template for manufacturing the mantle shell.

34. The method of claim 33, the 3D digital shell model of the mantle shell providing a reception for receiving the casting matrix, the reception of the mantle shell comprising straight internal side-faces, the casting matrix comprising straight external side-faces in contact with the straight internal side-faces of the mantle shell, when the mantle shell is slipped over the casting matrix.

35. The method of claim 33, the reception of the 3D digital shell model of the mantle shell comprising a U-shaped cross section, the outer 3D geometrical form of the 3D digital matrix model comprising a matching U-shaped cross section.

36. The method of claim 33, the 3D digital shell model comprising one or more injection channels configured for inserting the casting material by injecting the casting material into the one or more recesses of the 3D digital matrix model, over which the 3D digital shell model is slipped.

37. The method of claim 33, the 3D digital shell model comprising one or more venting channels configured for letting out air from the one or more recesses, when the casting material is inserted into the one or more recesses of the 3D digital matrix model, over which the 3D digital shell mode is slipped.

38. The method of claim 33, further comprising manufacturing the mantle shell using the 3D digital shell model as a template, the manufactured mantle shell being a physical copy of the respective template.

39. The method of claim 38, the mantle shell being manufactured using one of the following: machining, 3D printing, casting.

40. The method of claim 38, the mantle shell being manufactured using a material which is more rigid than a material used for manufacturing the casting matrix.

41. The method of claim 1, the one or more recesses of the 3D digital casting model each comprising the one or more receptions for receiving the one or more artificial teeth of the removable denture, each of the one or more receptions comprising a through-hole for inserting an attachment element for attaching the artificial teeth to the 3D digital casting model.

42. The method of claim 1, the removable denture being one of the following: a removable partial denture, a removable full denture.

43. The method of claim 1, the 3D digital tissue model comprising one of the following: a 3D digital mandibular tissue model of a mandibular jaw, a 3D digital maxillary model of a maxillary jaw.

44. The method of claim 43, each of the jaws being one of the following: a partially edentulous jaw comprising one or more teeth, a completely edentulous jaw.

* * * * *